US012795165B2

(12) United States Patent
Abe et al.

(10) Patent No.: US 12,795,165 B2
(45) **Date of Patent: *Nov. 10, 2026**

(54) TRANSMITTING METHOD FOR TRANSMITTING A BISTREAM GENERATED BY AN ENCODING METHOD FOR ENCODING A PICTURE WITH A COMMON SYNTAX STRUCTURE REGARDLESS OF A VIDEO FORMAT OF A VIDEO INCLUDING THE PICTURE

(71) Applicant: Panasonic Intellectual Property Corporation of America, Torrance, CA (US)

(72) Inventors: Kiyofumi Abe, Osaka (JP); Kazuhito Kimura, Shiga (JP); Hideyuki Ohgose, Osaka (JP); Hiroshi Arakawa, Tokyo (JP); Koji Arimura, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/052,517

(22) Filed: Feb. 13, 2025

(65) Prior Publication Data

US 2025/0184536 A1 Jun. 5, 2025

Related U.S. Application Data

(63) Continuation of application No. 18/380,277, filed on Oct. 16, 2023, now Pat. No. 12,256,101, which is a (Continued)

(30) Foreign Application Priority Data

Jun. 15, 2011 (JP) ................................ 2011-132978
Aug. 11, 2011 (JP) ................................ 2011-175814

(51) Int. Cl.
*H04N 19/70* (2014.01)
*H04N 19/112* (2014.01)
(Continued)

(52) U.S. Cl.
CPC ........... *H04N 19/60* (2014.11); *H04N 19/112* (2014.11); *H04N 19/16* (2014.11); *H04N 19/172* (2014.11);
(Continued)

(58) Field of Classification Search
CPC ........... H04N 19/00551; H04N 19/112; H04N 19/16; H04N 19/172; H04N 19/463; H04N 19/61
(Continued)

(56) References Cited

U.S. PATENT DOCUMENTS 5,461,420 A * 10/1995 Yonemitsu ........... H04N 19/577 348/E7.015
5,771,357 A * 6/1998 Kato ...................... H04N 19/00 375/E7.254
(Continued)

FOREIGN PATENT DOCUMENTS

EP 0 588 669 3/1994
EP 2 723 074 4/2014
(Continued)

OTHER PUBLICATIONS

International Search Report (ISR) issued Sep. 18, 2012 in International (PCT) Application No. PCT/JP2012/003909.
(Continued)

*Primary Examiner* — James T Boylan
(74) *Attorney, Agent, or Firm* — Wenderoth, Lind & Ponack, L.L.P.

(57) ABSTRACT

An encoding method includes determining video format information, (i) setting each of all frames or all fields which
(Continued)

are included in the video, as a picture, regardless of whether the video format is the interlace format or the progressive format, (ii) setting a POC indicating display order to each of all of the set pictures one by one, the POC being different each other, and encoding a picture to be encoded which is the frame or the field with reference to a picture previously encoded before encoding the picture to be encoded. In the encoding, the video is encoded with a syntax structure which is not dependent on the video format, the video format information is encoded in a header of a sequence which is a unit of the video, and the encoded bit stream is generated.

2 Claims, 21 Drawing Sheets

Related U.S. Application Data continuation of application No. 18/081,873, filed on Dec. 15, 2022, now Pat. No. 11,831,919, which is a continuation of application No. 17/245,206, filed on Apr. 30, 2021, now Pat. No. 11,570,472, which is a continuation of application No. 15/624,947, filed on Jun. 16, 2017, now Pat. No. 11,025,956, which is a continuation of application No. 14/105,561, filed on Dec. 13, 2013, now abandoned, which is a continuation of application No. PCT/JP2012/003909, filed on Jun. 14, 2012.

(51) Int. Cl.
*H04N 19/16* (2014.01)
*H04N 19/172* (2014.01)
*H04N 19/463* (2014.01)
*H04N 19/60* (2014.01)
*H04N 19/61* (2014.01)

(52) U.S. Cl.
CPC ........... *H04N 19/463* (2014.11); *H04N 19/70* (2014.11); *H04N 19/61* (2014.11)

(58) Field of Classification Search
USPC ..................................................... 375/240.24
See application file for complete search history.

(56) References Cited

U.S. PATENT DOCUMENTS

| | | | | |
|---|---|---|---|---|
| 6,064,803 | A | 5/2000 | Watabe et al. | |
| 6,072,531 | A | 6/2000 | Shibano | |
| 6,078,694 | A | 6/2000 | Takahashi et al. | |
| 6,310,897 | B1 | 10/2001 | Watanabe et al. | |
| 7,002,998 | B2 | 2/2006 | Watanabe et al. | |
| 7,236,207 | B2 | 6/2007 | Chen et al. | |
| 7,551,672 | B1 | 6/2009 | Tahara et al. | |
| 7,630,443 | B2 | 12/2009 | Sato | |
| 7,864,838 | B2 | 1/2011 | Kadono et al. | |
| 8,116,380 | B2 | 2/2012 | Regunathan et al. | |
| 8,319,890 | B2 | 11/2012 | Seupel | |
| 10,659,775 | B2 * | 5/2020 | Abe | H04N 19/112 |
| 10,869,035 | B2 | 12/2020 | Lai et al. | |
| 11,025,956 | B2 * | 6/2021 | Abe | H04N 19/463 |
| 11,102,472 | B2 * | 8/2021 | Abe | H04N 19/102 |
| 11,570,472 | B2 * | 1/2023 | Abe | H04N 19/112 |
| 11,611,741 | B2 * | 3/2023 | Abe | H04N 19/46 |
| 11,831,919 | B2 | 11/2023 | Abe et al. | |
| 12,256,101 | B2 | 3/2025 | Abe et al. | |
| 2002/0031123 | A1 | 3/2002 | Watanabe et al. | |
| 2004/0013312 | A1 * | 1/2004 | Kajiwara | G06T 9/007 375/E7.072 |
| 2004/0101049 | A1 * | 5/2004 | Sugiyama | H04N 19/61 375/E7.15 |
| 2004/0246373 | A1 | 12/2004 | Kadono et al. | |
| 2005/0002646 | A1 | 1/2005 | Sato | |
| 2005/0013498 | A1 | 1/2005 | Srinivasan et al. | |
| 2005/0100093 | A1 * | 5/2005 | Holcomb | H04N 19/137 375/240.12 |
| 2005/0111547 | A1 | 5/2005 | Holcomb et al. | |
| 2005/0152457 | A1 * | 7/2005 | Regunathan | H04N 19/46 375/E7.184 |
| 2006/0072669 | A1 | 4/2006 | Lin et al. | |
| 2006/0120456 | A1 | 6/2006 | Tasaka et al. | |
| 2007/0237238 | A1 | 10/2007 | Xia et al. | |
| 2008/0019438 | A1 | 1/2008 | Takahashi et al. | |
| 2011/0206111 | A1 | 8/2011 | Chen et al. | |
| 2011/0274163 | A1 | 11/2011 | Abe et al. | |
| 2012/0082209 | A1 | 4/2012 | Li et al. | |
| 2013/0272377 | A1 | 10/2013 | Karczewicz et al. | |

FOREIGN PATENT DOCUMENTS

| | | |
|---|---|---|
| JP | 11-155132 | 6/1999 |
| JP | 2004-328634 | 11/2004 |
| KR | 10-2007-0030825 | 3/2007 |
| KR | 10-2008-0089676 | 10/2008 |
| WO | 98/10591 | 3/1998 |

OTHER PUBLICATIONS

TTC Hyojun JT-H263 "Video Coding for Low Bitrate Communication", Tei Bit Rate Tsushin-yo Video Fugoka Hoshiki, 3.3th edition, The Telecommunication Technology Committee, pp. 189-201, Nov. 17, 2009.

Jisedai Dogazo Fugoka Hoshiki MPEG-4 AVC/H.264, Kabushiki Kaisha Triceps, pp. 13, 38-40, 42-44, 50, and 156-157, Mar. 12, 2004.

Shun-ichi Sekiguchi et al., "Proposal on the support of interlace format in HEVC", Joint Collaborative Team on Video Coding (JCT-VC) of ITU-T SG16 WP3 and ISO/IEC JTC1/SC29/WG11 6th Meeting: Torino, IT, Document JCTVC-F194, ITU-T, Jul. 1, 2011.

Keiichi Chono, "On issues for interlaced format support in HEVC standard", Joint Collaborative Team on Video Coding (JCT-VC) of ITU-T SG16 WP3 and ISO/IEC JTC1/SC29/WG11 7th Meeting: Geneva, CH, Document: JCTVC-G170, ITU-T, Nov. 8, 2011.

Osnat Bar-Nir, "Picture-adaptive Field/Frame Coding: support for legacy video", Joint Collaborative Team on Video Coding (JCT-VC) of ITU-T SG16 WP3 and ISO/IEC JTC1/SC29/WG11 7th Meeting: Geneva, CH, Document: JCTVC-G296, ITU-T, Nov. 8, 2011.

Kazuo Sugimoto et al., "High level syntax to support interlace format", Joint Collaborative Team on Video Coding (JCT-VC) of ITU-T SG16 WP3 and ISO/IEC JTC1/SC29/WG11 7th Meeting: Geneva, CH, Document: JCTVC-G450, ITU-T, Nov. 8, 2011.

Vieron Jerome and Thiesse Jean-Marc, "Interlaced and 4:2:2 color format support in HEVC standard", Joint Collaborative Team on Video Coding (JCT-VC) of ITU-T SG16 WP3 and ISO/IEC JTC1/SC29/WG11 7th Meeting: Geneva, CH, Document: JCTVC-G0877, ITU-T, Nov. 14, 2011.

Keiichi Chono, "AHG13: on interlace indication", Joint Collaborative Team on Video Coding (JCT-VC) of ITU-T SG16 WP3 and ISO/IEC JTC1/SC29/WG11 8th Meeting: San Jose, CA, USA, Document: JCTVC-H0056, ITU-T, Jan. 20, 2012.

Kazuo Sugimoto et al., "AHG13: Proposed interlace format indication for HEVC", Joint Collaborative Team on Video Coding (JCT-VC) of ITU-T SG16 WP3 and ISO/IEC JTC1/SC29/WG11 8th Meeting: San Jose, CA, USA, Document: JCTVC-H0588, ITU-T, Feb. 3, 2012.

ITU-T H.264: "Advanced video coding for generic audiovisual services", Series H: Audiovisual and Multimedia Systems, Infrastructure of audiovisual services—coding of moving video, Telecommunication Standardization Sector of ITU, Mar. 2010.

Benjamin Bross et al., "High Efficiency Video Coding (HEVC) text specification draft 10 (for FDIS & Last Call)", Joint Collaborative Team on Video Coding (JCT-VC), 12th Meeting: Geneva, CH, Jan. 14-23, 2013, JCTVC-L1003 v34.

(56) References Cited

OTHER PUBLICATIONS

Notification of Transmittal of Translation of the International Preliminary Report on Patentability (Chapter I or Chapter II) and Written Opinion issued Dec. 17, 2013 in International Patent Application No. PCT/JP2012/003909.

Partial English Translation of "TTC Hyojun JT-H263 "Video Coding for Low Bitrate Communication", Tei Bit Rate Tsushin-yo Video Fugoka Hoshiki, 3.3th edition, The Telecommunication Technology Committee, pp. 189-201, Nov. 17, 2009."

English translation of Jisedai Dogazo Fugoka Hoshiki MPEG-4 AVC/H.264, Kabushiki Kaisha Triceps, pp. 13, 38-40, 42- 44, 50, and 156-157, Mar. 12, 2004.

Supplementary European Search Report (ESR #1) issued Aug. 22, 2014 in corresponding European Patent Application No. EP 12 80 1097.

Supplementary European Search Report (ESR #2) issued Aug. 22, 2014 in related European Patent Application No. EP 12 80 0607.

Anonymous:, "The H. 264 Advanced Video Compression Standard, 2nd Edition, chapter 5, H.264 syntax, Iain E. Richardson", Not Known, XP030001636, pp. 99-135, Apr. 20, 2010.

E. Francois et al., "Restrictions on interlaced coding in SVC", 23. JVT Meeting; 80, MPEG Meeting; Apr. 21, 2007-Apr. 27, 2007; San Jose CR, U.S .; (Joint Video Team of ISO/IEC JTC1/SC29/WG11 and ITU-T SG. 16), XP030006985, ISSN: 0000-0155, pp. 1-8, Apr. 21, 2007.

Chad Fogg, et al., "Interlace Indicators", 8. JCT-VC Meeting; 99. MEPG Meeting; Feb. 1, 2012-Feb. 1, 2012, San Jose; (Joint Collaborative Team on Video Coding of ISO/IEC JTC1/SC29/WG11 and ITU-T SG.16); No. JCTVC-H0666, XP030111693, pp. 1-2, Jan. 25, 2012.

K. Sugimoto et al., "AHG 13: Proposed interlace format indication for HEVC", 8. JCT-VC Meeting; 99. MPEG Meeting; Feb. 1, 2012-Feb. 10, 2012, San Jose; (Joint Collaborative Team on Video Coding of ISO/IEC JTC1/SC29/WG11 and ITU-T SG.16); No. JCTVC-H0588, XP030111615, pp. 1-2, Jan. 23, 2012.

K. Kazui et al., "Introduction of A VC's derivation process of chroma motion vector for interlace format support", 8. JCT-VC Meeting; 99. MPEG Meeting; Feb. 1, 2012-Feb. 10, 2012, San Jose; (Joint Collaborative Team on Video Coding of ISO/IEC JTC1/SC29/WG11 and ITU-T SG. 16); No. JCTVC-H0222, XP030111249, pp. 1-7, Jan. 21, 2012.

K Chono et al., "JCTVC AHG Report Interlace indication (AHG 13)", 8. JCT-VC Meeting; 99. MPEG Meeting; Feb. 1, 2012-Feb. 10, 2012, San Jose; (Joint Collaborative Team on Video Coding of ISO/IEC JTC1/SC29/WG11 and ITU-T SG. 16); No. JCTVC-H0013, XP030111057, pp. 1-3, Jan. 30, 2012.

K Chono et al., "On issues for interlaced format support in HEVC standard", 98. MPEG Meeting; Nov. 28, 2011-Dec. 2, 2011, Geneva; (Motion Picture Expert Group or ISO/IEC JTC1/SC29/WG11); No. m21723, XP030050286, pp. 1-6, Nov. 21, 2011.

K. Sekiguchi et al., "Proposal on the support of interlace format in HEVC", 97. MPEG Meeting; Jul. 18, 2011-Jul. 22, 2011; Torino; (Motion Picture Expert Group or ISO/IEC JTC1/SC29/WG11), No. m20613, XP030049176, pp. 1-3, Jul. 1, 2011.

European Office Action issued Oct. 1, 2015 in corresponding European Application No. 12801097.2.

"Advanced video coding for generic audiovisual services," ITU-T Recommendation H.264, ITU, Mar. 2005, pp. i-ix, 1-4, 39-46, 63-80, 98-102, 275-278, 285-288.

Office Action dated Apr. 21, 2016 in U.S. Appl. No. 14/107,292.

Office Action issued Nov. 17, 2016 in U.S. Appl. No. 14/107,292.

ISO/IEC 14496-10, Information technology—Coding of audio-visual objects—Part 10: Advanced Video Coding.

Summons to attend oral proceeding pursuant to Rule 115(1) EPC issued Jan. 24, 2017 in European Patent Application No. 12801097.2.

Office Action issued Jun. 12, 2018 in U.S. Appl. No. 15/722,119.

Office Action issued Feb. 7, 2019 in U.S. Appl. No. 15/722,119.

Standard S.M.P.T.E. "VC-2 Video Compression", (2009): 2042-1 (Year: 2009).

Notification of Reason for Refusal issued Apr. 2, 2019 in Korean Patent Application No. 10-2013-7033185, which English translation.

Office Action issued Jun. 13, 2019 in U.S. Appl. No. 15/722,119.

Office Action issued Oct. 10, 2019 in Korean Application No. 10-2013-7033185, with English translation.

Office Action issued Aug. 24, 2020 in Korean Application No. 10-2020-7012024, with English translation.

Office Action issued Jan. 6, 2021 in U.S. Appl. No. 16/845,322.

Office Action issued Apr. 16, 2026 in U.S. Appl. No. 19/199,641.

Office Action issued Dec. 22, 2015 in Japanese Patent Application No. 2015-230508 with partial English translation.

* cited by examiner

*Fig.7*

| |
|---|
| seq_parameter_set_data( ) { |
| ...... |
| vui_parameters ( ) { |
| ...... |
| interlace_flag; |
| if ( interlace_flag == 1 ) { |
| continual_flag; |
| if ( continual_flag == 0 ) { |
| max_distance_num; |
| } |
| } |
| ...... |
| } |
| } |

interlace_flag;

0 : video format is progressive format

1 : video format is interlace format continual_flag;

0 · top field and the bottom field are not continual in encoding order 1 top field and the bottom field are continual in encoding order max_distance_num;

maximum number of pictures in which top field and bottom field belonging to the same frame apart from each other in the encoding order in sequence

*Fig.8*

| |
|---|
| pic_timing_SEI( ) { |
|     ...... |
|     pic_struct; |
|     if ( pic_struct == 1 or 2 ) { |
|         field_pair_POC; |
|     } |
|     ...... |
| } |

pic_struct;

0 : frame

1 : top field

2 : bottom field

......

field_pair_POC;

specifying POCs of a pair of fields about frame belonging to objective field

Fig. 17

```
pic_timing_SEI( ) {
    ......
    interlace_flag;
    if ( interlace_flag == 1 ) {
        continual_flag;
        if ( continual_flag == 0 ) {
            max_distance_num;
        }
    }
    ......
    pic_struct;
    if ( pic_struct == 1 or 2 ) {
        field_pair_POC;
    }
    ......
}
```

interlace_flag;

0 : video format is progressive format

1 : video format is interlace format continual_flag;

0 : top field and the bottom field are not continual in encoding order 1 top field and the bottom field are continual in encoding order max_distance_num;

maximum number of pictures in which top field and bottom field belonging to the same frame apart from each other in the encoding order in sequence pic_struct;

0 : frame

1 : top field

2 : bottom field

......

field_pair_POC;

specifying POCs of a pair of fields about frame belonging to objective field

TRANSMITTING METHOD FOR TRANSMITTING A BISTREAM GENERATED BY AN ENCODING METHOD FOR ENCODING A PICTURE WITH A COMMON SYNTAX STRUCTURE REGARDLESS OF A VIDEO FORMAT OF A VIDEO INCLUDING THE PICTURE

CROSS REFERENCE TO RELATED APPLICATIONS

This application is a continuation of U.S. application Ser. No. 18/380,277 filed on Oct. 16, 2023, which is a continuation of U.S. application Ser. No. 18/081,873, now U.S. Pat. No. 11,831,919, filed on Dec. 15, 2022, which is a continuation of U.S. application Ser. No. 17/245,206, now U.S. Pat. No. 11,570,472, filed on Apr. 30, 2021, which is a continuation of U.S. application Ser. No. 15/624,947, now U.S. Pat. No. 11,025,956, filed on Jun. 16, 2017, which is a continuation of U.S. application Ser. No. 14/105,561, now abandoned, filed on Dec. 13, 2013, which is a continuation of PCT International Patent Application Number PCT/JP2012/003909 filed on Jun. 14, 2012, claiming the benefit of priority of Japanese Patent Application No. 2011-132978, filed Jun. 15, 2011, and Japanese Patent Application No. 2011-175814, filed Aug. 11, 2011. The entire disclosures of the above-identified applications, including the specifications, drawings, and claims are incorporated herein by reference in their entirety.

BACKGROUND

1. Technical Field

The present disclosure relates to an encoding device and an encoding method for encoding progressive video signals and interlace video signals.

2. Related Art

In recent years, as multimedia application programs have been developed, integrated use of information from various media including video, audio, and text has prevailed. However, a digitized video contains a large amount of data. Then, video compression technologies are essential to store and transmit a video.

On the other hand, standardization of compression technologies is also important for interoperation of the compressed video data. For example, as standard specifications of video compression technologies, H.261, H.263, and H.264 of ITU-T (International Telecommunication Union Telecommunication Standardization Sector), MPEG-1, MPEG-2, MPEG-4, and MPEG-4AVC of ISO/IEC (International Organization for Standardization), and the like are known. Further, a standardization activity for the next-generation video coding system called HEVC (High-Efficiency Video Coding) is currently carried out by ITU-T jointly with ISO/IEC.

In those kinds of video coding, a picture to be encoded is divided into encoded unit blocks and redundancy in a time direction and redundancy in a spatial direction are reduced for each of the blocks. Those kinds of video coding compress the amount of information in that manner. In inter predictive coding for reducing time redundancy, a forward or backward picture is referenced, so that movement is detected and a predicted image is created for each block, and then, a difference image between the created predicted image and the block to be encoded is acquired. In intra predictive coding for reducing spatial redundancy, a predicted image is generated from pixel information of surrounding encoded blocks, and then, a difference image between the acquired predicted image and the block to be encoded is acquired. Subsequently, orthogonal transform such as discrete cosine transform and quantization are applied to the acquired difference image and then a code string is generated by using variable length coding, and as a result, the amount of information is compressed.

In decoding, the code string which is generated by the above described encoding process is analyzed, so that predictive information and residual coefficient information are acquired. Further, inter predictive decoding and intra-frame predictive decoding are applied by using the predictive information, so that a predicted image is generated. Then, inverse quantization and inverse orthogonal transform are applied to the residual coefficient information, so that a difference image is generated, and then, the generated predicted image and the generated difference image are added, so that a final output image is restored.

As two formats of video to be encoded and decoded, a progressive format and an interlace format are used on this occasion.

In the progressive format, all of the pixels of a screen are simultaneously imaged to be a frame. On the other hand, in the interlace format, a frame is composed of two fields: a top field, which contains only the pixels of even-numbered lines imaged among the pixels of a screen; and a bottom field, which contains only the pixels of odd-numbered lines imaged among the pixels of a screen.

FIGS. 20 and 21 illustrate methods of encoding a progressive video and an interlace video based on H.264, respectively. As illustrated in FIG. 20, in encoding a progressive video, a frame is encoded as a picture. For example, Frm3 is encoded as P_Frm1. In the encoding, information specifying a display order called POC (Picture Order Count) is assigned to each picture. For example, since P_Frm1 is displayed at the position of Frm3 in the display order, 3 is assigned to P_Frm1 as the POC.

On the other hand, as illustrated in FIG. 21, a method of encoding a field as a picture and a method of encoding two fields as a picture are known for encoding the interlace video. For example, FldT6 and FldB7 are encoded as pictures of separate field structures such as P_FldT1 and P_FldB2, whereas FldT12 and FldB13 are encoded as a picture of a single frame structure such as P_Frm7. A value of the POC is assigned to a picture in the case where a field is encoded as a picture of a field structure, whereas two values of the POC are assigned to a picture in the case where two fields are encoded as a picture of a frame structure. For example, since P_Frm7 is displayed as divided pictures at two positions of FldT12 and FldB13, 12 and 13 are assigned to P_Frm7 as the POCs (ITU-T H.264: Advanced video coding for generic audiovisual services (March 2010)).

On the other hand, since the HEVC is a coding system which only enables encoding of a progressive video, only a method of encoding a frame as a picture as illustrated in FIG. 20 is defined in the HEVC (JCT-VC WD2: Working Draft 2 of High-Efficiency Video Coding (March 2011)).

SUMMARY

It is expected that the progressive format will replace the interlace format to be the mainstream video format in the future. But on the other hand, since many of the existing video contents have been created in the interlace format, effective use of these contents will be also needed in the future.

However, as described above, the HEVC which is currently in the standardization process defines an encoding method only for the progressive format and does not enable encoding of interlace contents.

One non-limiting and exemplary embodiment solves the above described problem, and easily realizes supporting of the interlace format in encoding and decoding of a video by using the HEVC.

An encoding method according to the present disclosure encodes video in units of pictures to generate an encoded bit stream. The encoding method includes:

determining video format information indicating which video format is used for encoding the video among an interlace format or a progressive format, (i) setting each of all frames or all fields which are included in the video, as a picture, regardless of whether the video format is the interlace format or the progressive format, and (ii) setting a POC indicating display order to each of all of the set pictures one by one, the POC being different each other, and encoding a picture to be encoded which is the frame or the field with reference to a picture previously encoded before encoding the picture to be encoded, wherein in the encoding, the video is encoded with a syntax structure which is not dependent on the video format, the video format information is encoded in a header of a sequence which is a unit of the video, and the encoded bit stream is generated.

An encoding device according to the present disclosure encodes video in units of pictures to generate an encoded bit stream. The video encoding device includes:

a determiner that determines video format information indicating which video format is used for encoding the video among an interlace format or a progressive format, a picture setter that (i) each of all frames or all fields which are included in the video, as a picture, regardless of whether the video format is the interlace format or the progressive format, and (ii) sets a POC indicating display order to each of all of the set pictures one by one, the POC being different each other, an encoder that encodes a picture to be encoded which is the frame or the field with reference to a picture previously encoded before encoding the picture to be encoded, to generate the encoded bit stream, and an outputter that outputs the encoded bit stream, wherein in the encoder, the video is encoded with a syntax structure which is not dependent on the video format, the video format information is encoded in a header of a sequence which is a unit of the video, and the encoded bit stream is generated.

The present disclosure can be realized not only as the above described encoding device but also as a program or an integrated circuit that is equivalent to each unit included in the encoding device.

The video encoding device according to the present disclosure enables an encoding process and display control to be applied to picture data under a common control without increasing the processing amount for both a code string that is acquired as a result of encoding a progressive video and a code string that is acquired as a result of encoding an interlace video. Therefore, the video encoding device facilitates implementation of a encoding device.

Generally, in a video decoding device, a decoding process for decoding an encoded code string to generate a decoded video and a display process for displaying the generated decoded video on a corresponding display device by adapting the video to the device are controlled as different levels. For example, such a method is possible that the former process is formed by hardware and the latter process is formed by software. The method can reduce the man-hours for development, for example, in developing the devices that are different in the display method such as a television set and a personal computer by using common hardware for performing the decoding process and only creating software programs for performing the display process respectively for the devices.

In the present disclosure, the extended information area in that only the information unnecessary for the encoding process (display control information, and the like) is described and the other areas in that information necessary for the decoding process is described are completely separated. As a result, the present disclosure facilitates sending of only the code strings needed by respective levels of the level of performing the decoding process and the level of performing the display process to the respective levels for the purpose like the above described use, therefore, improves independence of each level. That is, it allows to form the level of performing the decoding process (hardware) by using completely the common components in both the decoding device that supports the progressive and the decoding device that supports the interlace.

BRIEF DESCRIPTION OF DRAWINGS

FIG. 7 is a conceptual diagram for describing an example of a syntax of a sequence header generated by the embodiment.

FIG. 8 is a conceptual diagram for describing an example of a syntax of extended information generated by the embodiment.

FIG. 17 is a conceptual diagram for describing an example of a syntax of extended information generated by the third embodiment.

DETAILED DESCRIPTION (Background of the Embodiments)

As described in the section of Problem to be Solved by the Invention, the HEVC which is currently in the standardization process defines an encoding method only for the progressive format and does not enable encoding of interlace contents.

Figure 21:
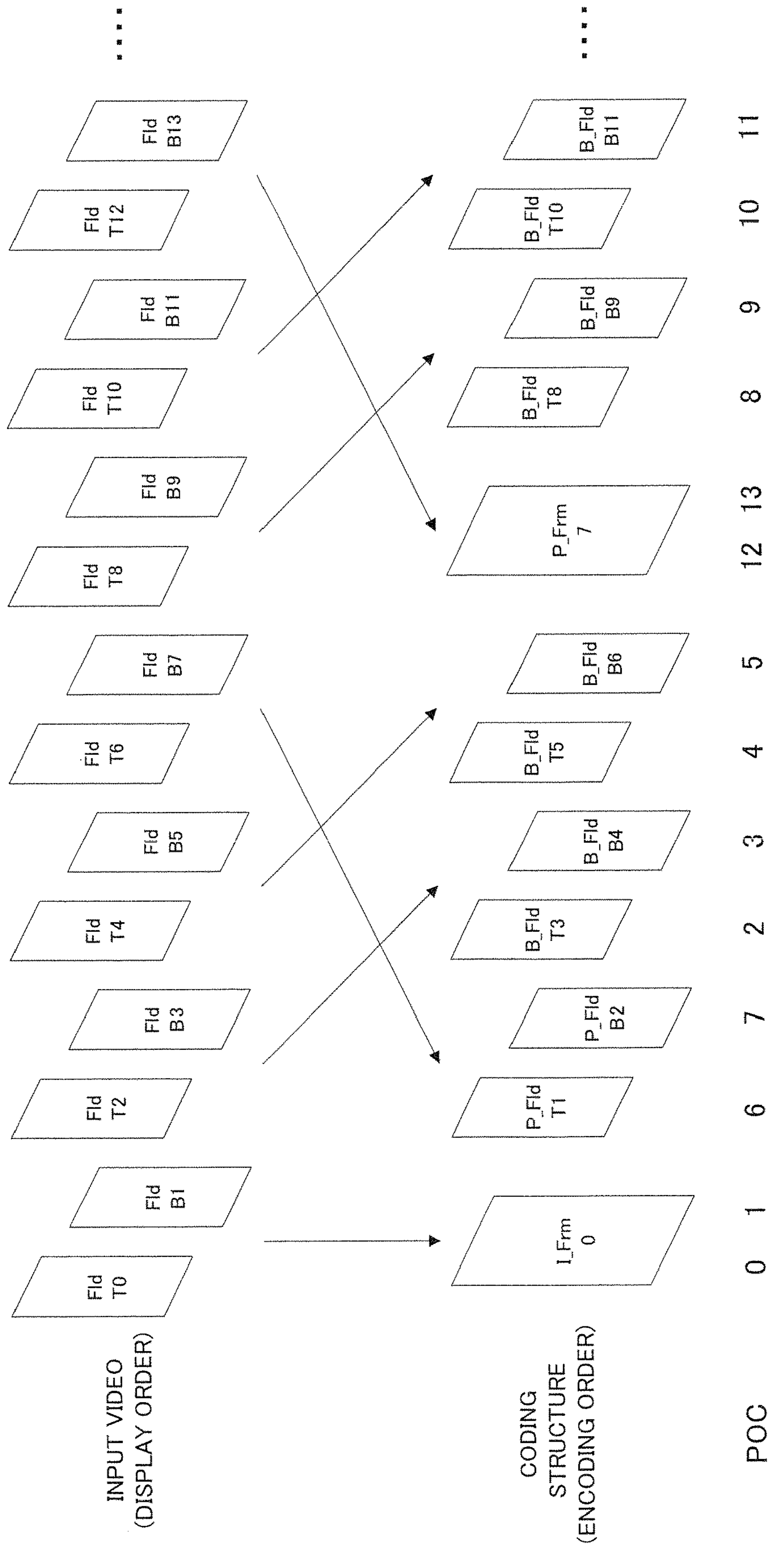
FIG. 21 is a conceptual diagram for describing a conventional encoding method of an interlace video.

In order to make the HEVC support the interlace format, an approach of introducing the same encoding control as that of H.264 which has been described with reference to FIG. 21 can be considered.

However, on the condition that the approach is adopted, the cases where the picture to be encoded has a frame structure like P_Frm7, or has a top field structure like P_FldT1, or has a bottom field structure like P_FldB2 have to be distinguished from each other when the encoding process and the decoding process are performed.

Further, in the HEVC, coding information of pictures which have been encoded once is referenced when the encoding process is performed on the picture to be encoded. Therefore, for example, in the case where the encoding object is P_Frm7 and the pictures which have their coding information referenced are P_FldT1 and P_FldB2, the coding information of the two pictures which have field structures has to be processed for reference into the coding information of a picture which has a frame structure. That substantially complicates the encoding process.

Then, in the video encoding device of the embodiments, in the case where video format information indicates the progressive format, a frame of the video signals is set as a picture, and in the case where the video format information indicates the interlace format, a field of the video signals is set as a picture. Subsequently, pixel data included in the set picture is encoded by using a common signal processing method and a common syntax structure which are not dependent on video formats.

Further, in the video decoding device of the embodiments, the first code string is decoded to acquire the picture by using the common syntax analyzing method and the common signal processing method, which are not dependent on the video formats. Then, in the case where the display control information indicates the progressive format, the acquired picture is set as a frame and the frames are output one by one in a display order, and in the case where the display control information indicates the interlace format, the acquired picture is set as a field and a pair of top field and bottom field are output in a display order when the pair of top field and bottom field are acquired.

The video encoding device and the video decoding device of the embodiments will be described in detail below.

(First Embodiment) (Encoding Process)

The first embodiment will be described with reference to the drawings.

1. Configuration of a Video Encoding Device

Figure 1:
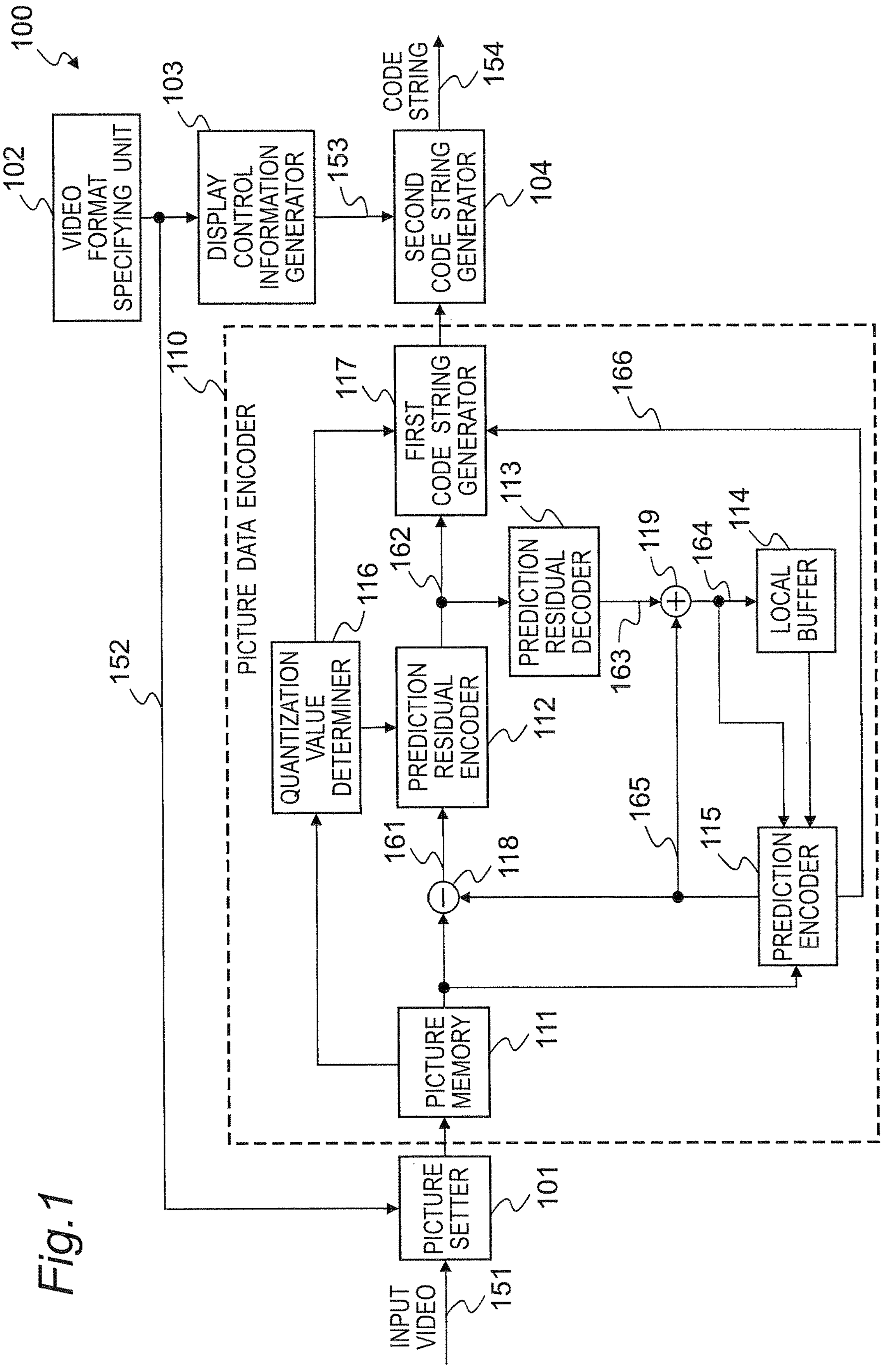
FIG. 1 is a block diagram illustrating a configuration of a video encoding device according to a first embodiment.

FIG. 1 is a block diagram of a video encoding device according to the embodiment.

The video encoding device 100 includes a picture setter 101, a video format specifying unit 102, a display control information generator 103, a second code string generator 104, and a picture data encoder 110. The picture data encoder 110 includes a picture memory 111, a prediction residual encoder 112, a prediction residual decoder 113, a local buffer 114, a prediction encoder 115, a quantization value determiner 116, and a first code string generator 117.

The picture setter 101 sorts input video signals 151 which are input in a display order in units of pictures in an encoding order according to video format signals 152 input from the video format specifying unit 102, and outputs the sorted input video signals 151 to the picture data encoder 110. At this moment, in the case where the video format of the picture is the progressive format, a frame corresponding to the input video signals 151 is set as a picture, and in the case where the video format is the interlace format, a field corresponding to the input video signals 151 is set as a picture.

The picture data encoder 110 divides each picture input from the picture setter 101 into blocks and performs an encoding process in units of blocks to generate a code string of picture data. At this moment, a common encoding process is applied in units of pictures without depending on whether the video format is the progressive format or the interlace format, and the generated code string of the picture data has a common syntax.

The video format specifying unit 102 determines whether the video to be encoded is in the progressive format or the interlace format based on information specified from outside or information indicated by the input video signals. Then, the video format specifying unit 120 outputs the video format signals 152 to the display control information generator 103 and the picture setter 101.

The display control information generator 103 generates display control information signals 153 according to the video format signals 152 input from the video format specifying unit 102 and outputs the display control information signals 153 to the second code string generator 104.

Here, the display control information signals 153 are control information signals which are used in a video decoding device corresponding to the video encoding device 100 in displaying a decoded video.

The second code string generator 104 encodes the display control information signals 153 output from the display control information generator 103 and information about encoding control in units of sequences and encoding control in units of pictures as header information to generate a picture upper layer code string. Further, the second code string generator 104 associates the generated picture upper layer code string with the code string of picture data generated by the picture data encoder 110 to generate code string signals 154 to be finally output.

Now, processes of the picture data encoder 110 will be described.

The picture memory 111 divides an input picture output from the picture setter 101 in units of pictures into blocks each of which includes a plurality of pixels. A block is a unit of the encoding process. In response to a readout instruction issued from a difference calculator 118, the prediction encoder 115, and the quantization value determiner 116 in units of blocks resulting from division, corresponding image signals are outputted. The block has, for example, horizontal 64 pixels by vertical 64 pixels, horizontal 32 pixels by vertical 32 pixels, or horizontal 16 pixels by vertical 16 pixels. That is, the block may be in any size as far as the processing after that is available to the block in the size.

The prediction residual encoder 112 performs orthogonal transform on difference image signals 161 output from the difference calculator 118. Further, the prediction residual encoder 112 quantizes an orthogonal transform coefficient of each of the acquired frequency components and generates residual encoding signals 162. Then, the prediction residual encoder 112 outputs the generated residual encoding signals 162 to the prediction residual decoder 113 and the first code string generator 117. At this moment, the prediction residual encoder 112 quantizes the orthogonal transform coefficient by using a quantization value determined by the quantization value determiner 116.

The prediction residual decoder 113 recovers difference image information by performing inverse quantization and inverse orthogonal transform on the residual encoding signals 162 output from the prediction residual encoder 112. Then, the prediction residual decoder 113 outputs generated residual decoding signals 163 to an addition calculator 119.

The local buffer 114 stores reconstructed image signals 164 output from the addition calculator 119. The reconstructed image signals 164 are used as referential pixel data in a predictive encoding process in encoding of pictures after the pictures currently to be encoded. In response to a readout instruction from the prediction encoder 115, the local buffer 114 outputs the stored reconstructed image signals 164 to the prediction encoder 115 as pixel data.

The prediction encoder 115 generates predicted image signals 165 by using intra prediction or inter prediction based on the image signals output from the picture memory 111. Then, the prediction encoder 115 outputs the generated predicted image signals 165 to the difference calculator 118 and the addition calculator 119. When the prediction encoder 115 uses the inter prediction, it uses the reconstructed image signals 164 of already encoded past pictures which have been stored in the local buffer 114. When the prediction encoder 115 uses the intra prediction, it uses the reconstructed image signals 164 of the current pictures of an already encoded block adjacent to the block to be encoded. Mode determination on whether to use the intra prediction or the inter prediction is based on estimation of which of the prediction methods can reduce the amount of information of residual signals (the amount of information of the residual encoding signals 162, the code string strings 154, and the like) more.

The quantization value determiner 116 determines the quantization value for quantizing the difference image signals 161 in the prediction residual encoder 112 based on the pictures stored in the picture memory 111. As a determination method of the quantization value in the quantization value determiner 116, a so-called rate control-based determination method of the quantization value, by which the quantization value is set to make a bit rate of the code string signals 154 approach a target bit rate, may be used.

The first code string generator 117 generates the code string of picture data by performing variable length coding on the residual encoding signals 162 output from the prediction residual encoder 112, prediction information signals 166 output from the prediction encoder 115, the quantization value output from the quantization value determiner 116, and information about the other encoding control.

The difference calculator 118 generates the difference image signals 161 which is a differential value between the image signals read out from the picture memory 111 and the predicted image signals 165 output from the prediction encoder 115. Then, the difference calculator 118 outputs the generated difference image signals 161 to the prediction residual encoder 112.

The addition calculator 119 generates the reconstructed image signals 164 by adding the residual decoding signals 163 output from the prediction residual decoder 113 and the predicted image signals 165 output from the prediction encoder 115. Then, the addition calculator 119 outputs the generated reconstructed image signals 164 to the local buffer 114.

2. Generation Method of Display Control Information

Figure 2:
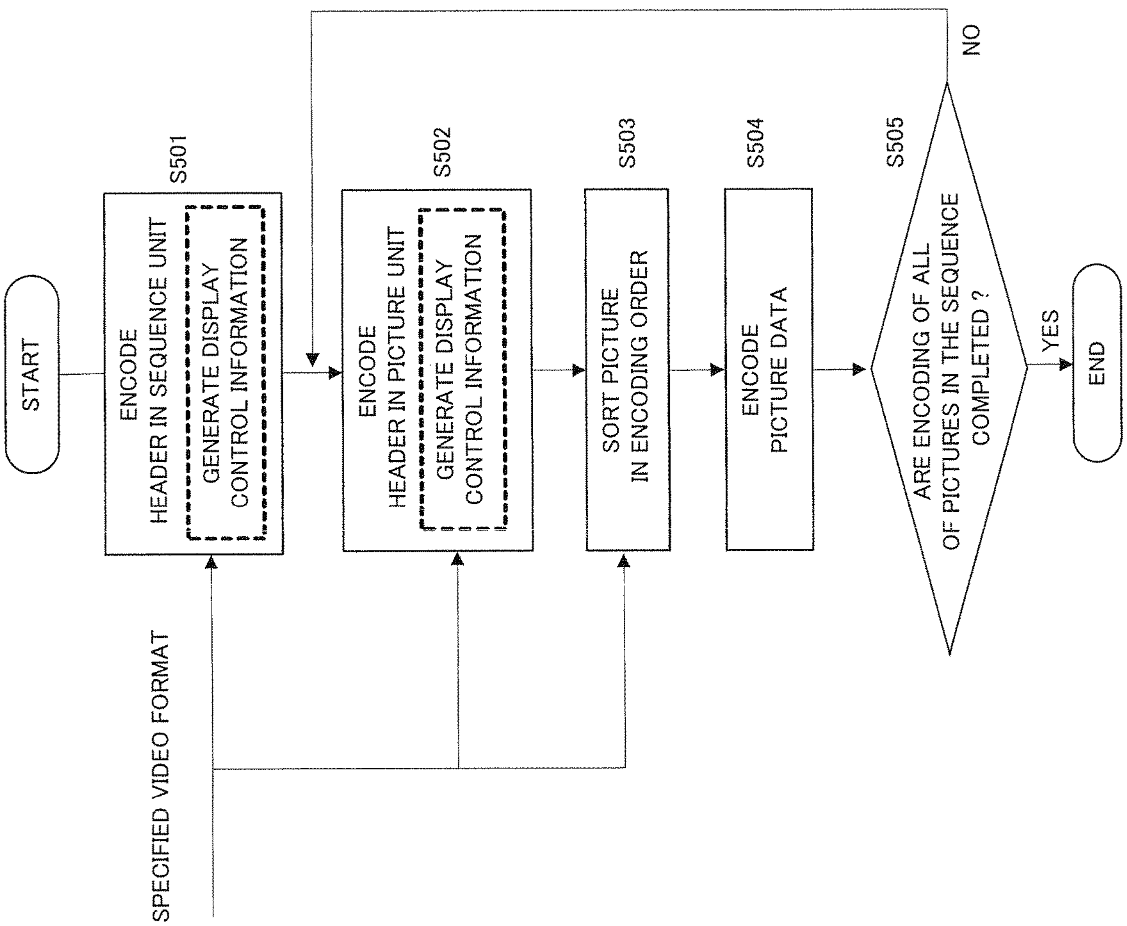
FIG. 2 is a flow chart of encoding process according to the first embodiment.

A method of generating the display control information signals 153 in the display control information generator 103 and describing the display control information signals 153 in a code string in the second code string generator 104 and a method of sort in an input video in an encoding order in the picture setter 101 in response to the video format signals 152 from the video format specifying unit 102 will be described specifically with reference to the flow chart of the entire encoding process of FIG. 2.

First, the second code string generator 104 performs code string generation on header areas in units of sequences (S501). Specifically, the second code string generator 104 describes the display control information in units of sequences generated by the display control information generator 103 into header areas in units of sequences in a code string. The display control information generator 103 generates display control information in units of sequences according to the video format specified by the video format specifying unit 102.

Next, the second code string generator 104 performs code string generation on header areas in units of pictures (S502). Specifically, the second code string generator 104 describes the display control information in units of pictures generated by the display control information generator 103 in extended information areas in units of pictures in a code string. The display control information generator 103 generates display control information in units of pictures according to the video format specified by the video format specifying unit 102.

Next, the picture setter 101 sorts the input picture which is input in a display order in an encoding order and selects a picture to be encoded (S503). Specifically, the picture setter 101 sorts the input picture according to the video format specified by the video format specifying unit 102.

Next, the picture data encoder 110 performs a series of encoding process described with reference to FIG. 1 to generate a code string of picture data (S504). Meanwhile, in step S504, a common encoding process is applied without depending on whether the video format is the progressive format or the interlace format Next, when the processes on the currently processed picture to be encoded are completed, the operation returns to step S502 to proceed to the encoding process of the next picture, and the processes from step S502 to step S504 are repeated until the encoding processes of all of the pictures in the sequence are completed (S505).

3. Sort of Pictures

A sort process of pictures in step S503 will be described in detail with reference to FIGS. 3, 4, and 5.

Figure 3:
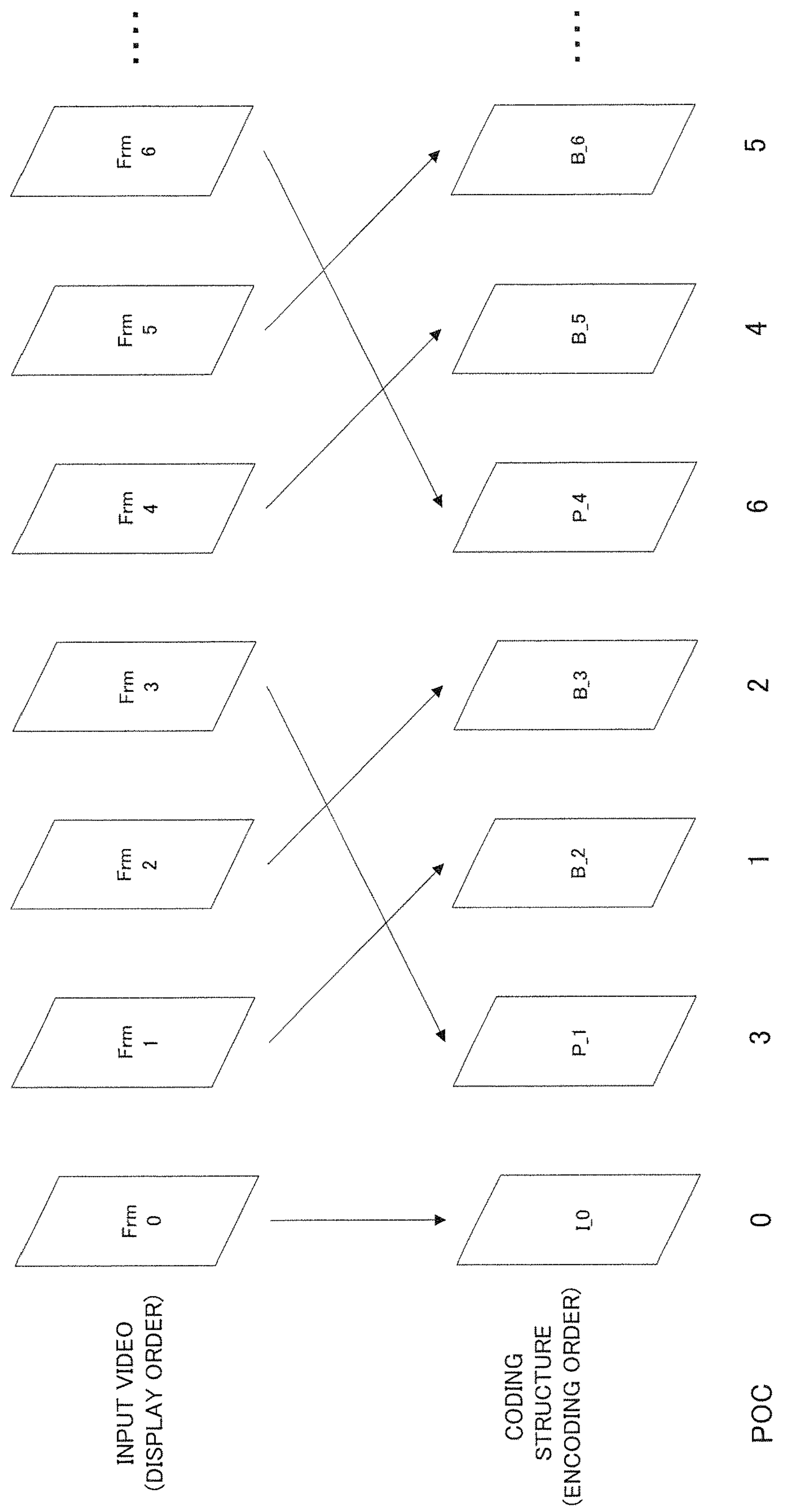
FIG. 3 is a conceptual diagram for describing an example of a method of sort in a progressive input video in an encoding order according to the first embodiment.
Figure 20:
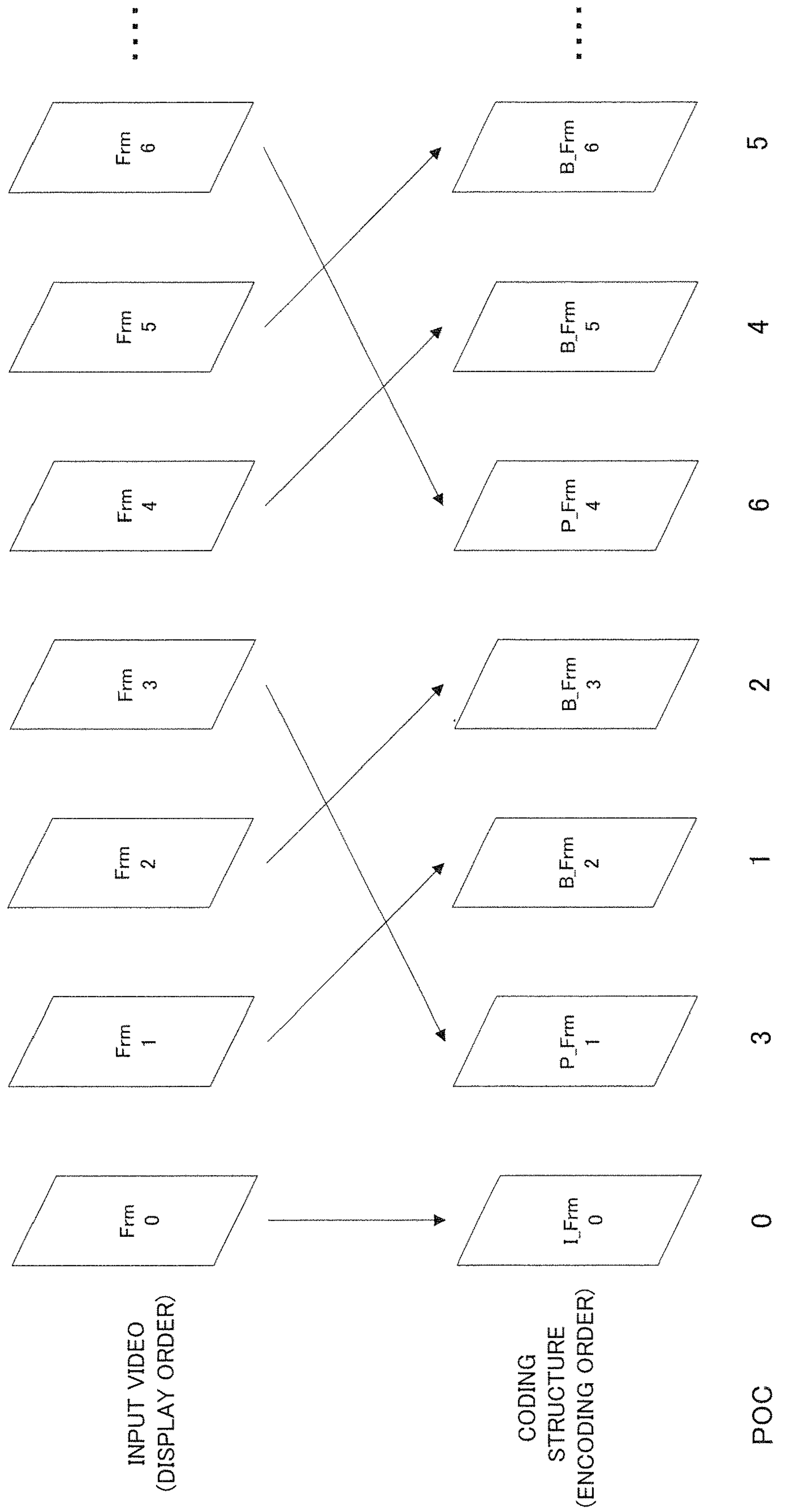
FIG. 20 is a conceptual diagram for describing a conventional encoding method of a progressive video.

A method illustrated in FIG. 3 is an example of a sort method of pictures in the case where the video format is the progressive format. This sort method is completely the same as the conventional process on the progressive format described with reference to FIG. 20. An input frame undergoes sort and is encoded as a picture. In the inter prediction, only the picture which has been encoded earlier in the encoding order can be referenced. That is, in the case where sort as illustrated in FIG. 3 is performed, P_1 can reference only I_0, and B_2 can reference I_0 and P_1. In terms of the display order, since P_1 corresponds to Frm3, P_1 can reference only Frm0 in the forward direction, and since B_2 corresponds to Frm1, B_2 can reference Frm0 in the forward direction and Frm3 in the backward direction. With the sort performed on the encoding order of the pictures as described above, a reference method of referential pictures in the inter prediction is allowed to be controlled and more effective prediction becomes available. Meanwhile, I_0 is a picture which only undergoes the intra prediction without referencing the other pictures.

Figure 4:
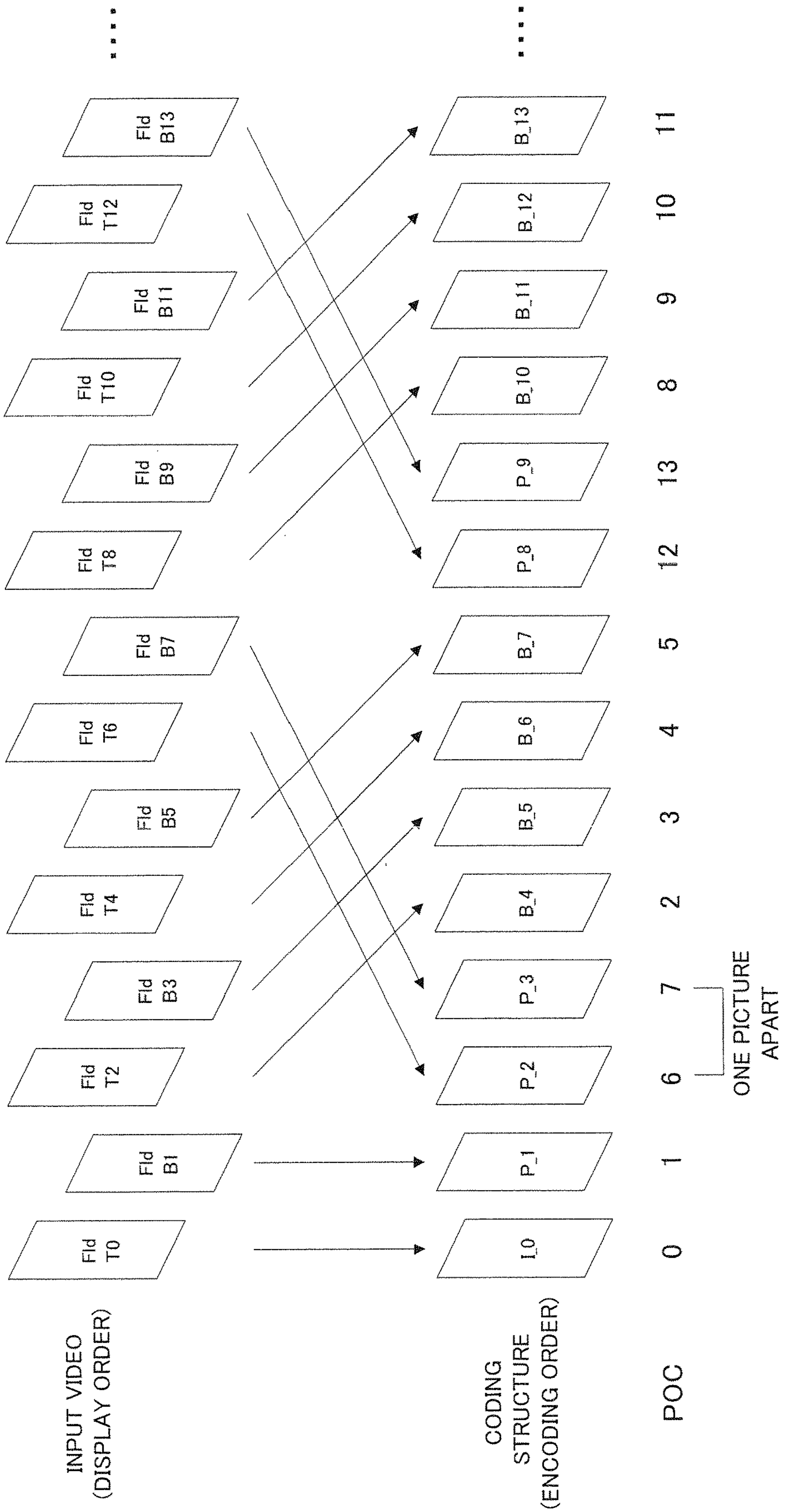
FIG. 4 is a conceptual diagram for describing an example of a method of sort in an interlace input video in an encoding order according to the first embodiment.
Figure 5:
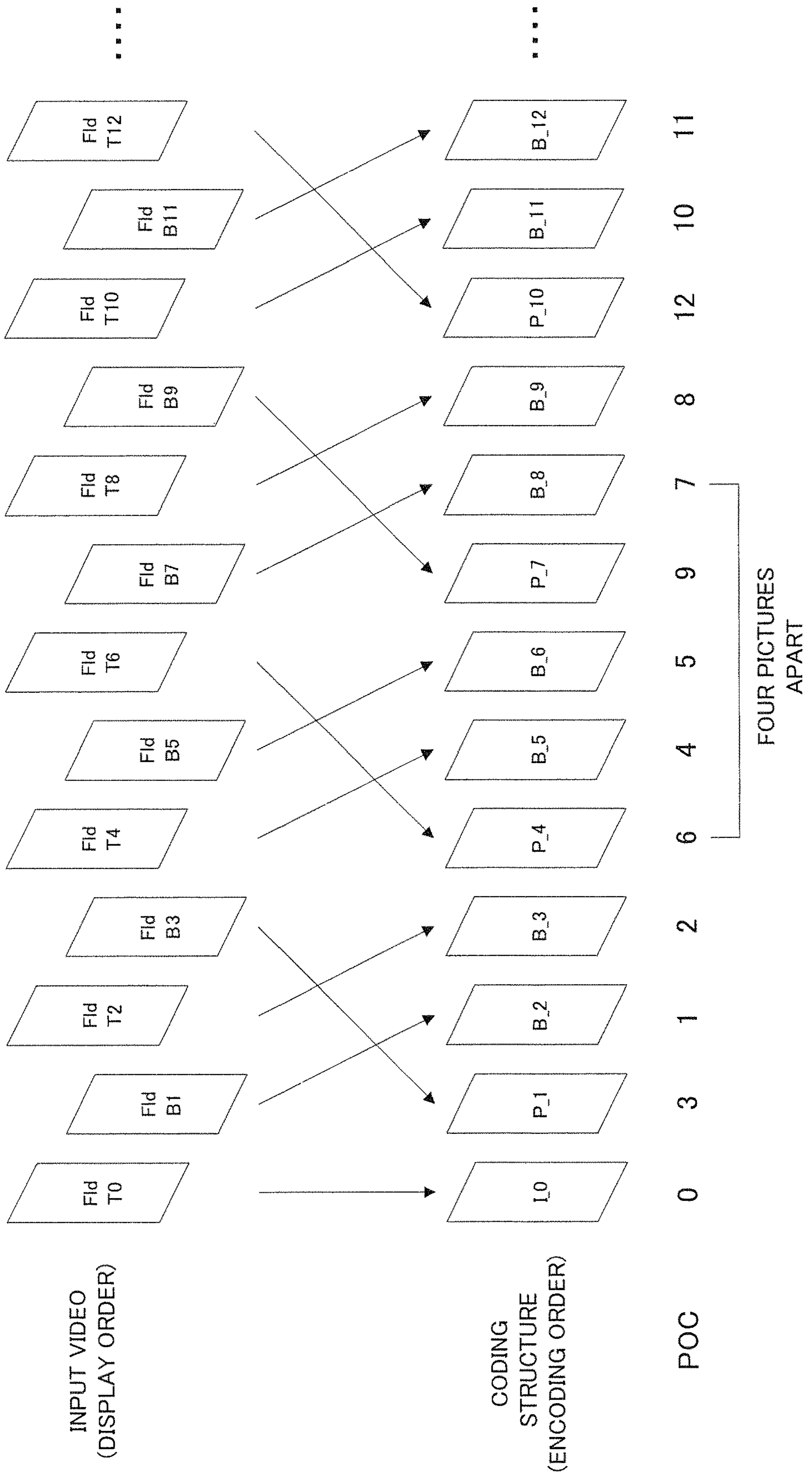
FIG. 5 is a conceptual diagram for describing another example of a method of sort in the interlace input video in an encoding order according to the first embodiment.

On the other hand, methods illustrated in FIGS. 4 and 5 are examples of a sort method of pictures in the case where the video format is the interlace format. Unlike the conventional processes on the interlace format described with reference to FIG. 21, the methods always perform sort and encoding on an input field as a picture. Also a POC which is information specifying the display order is always assigned to each picture. The encoding processes are performed on each of the pictures, which have undergone the sort, in completely the same method as in the case where the progressive format is input, without depending on whether each of the sorted pictures is a top field or a bottom field.

In the example of FIG. 4, the top field and the bottom field belonging to a frame are always paired in the sort. For example, FldT6 and FldB7 undergo the sort as P_2 and P_3, so that they are always continual with each other in the encoding order. That applies to all of the other pictures. With the above described sort performed, the input top field and bottom field are allowed to be continually transferred to the encoding process and a memory management process in the picture setter 101 can be simplified.

In contrast, in FIG. 5, the sort is performed regardless of which frame the top field and the bottom field belong to. In a coding structure alone, FIG. 5 is completely in the same structure as that in the case of the progressive format described in FIG. 3, but FldT6 and FldB7, for example, are sorted to be P_4 and B_8 which become apart from each other by four pictures in the encoding order. The other pictures are also sorted to be apart from each other by one picture to four pictures in the encoding order. With the above described sort, the pictures are allowed to undergo the process in completely the same encoding order both in the progressive format and the interlace format. However, it is needed to transfer the input top field and bottom field to the encoding process with the fields shifted by maximum of four pictures, which complicates the memory management process in the picture setter 101.

4. Configuration and Syntax of the Code String

Now, a configuration of the code string generated by the embodiment will be described with reference to FIG. 6.

The code string indicated by the code string signals 154 output from the second code string generator 104 includes a sequence header area in which encoding control information in units of sequences is described, a picture header area in which encoding control information in units of pictures is described, an extended information area in which auxiliary information in units of pictures is described, and picture data. Here, the display control information in units of sequences described in step S501 of FIG. 2 is described in the sequence header area. Further, the display control information in units of pictures described in step S502 of FIG. 2 is described in the extended information area. The respective types of information other than the display control information are described in the code string of a common syntax without depending on whether the video format is the progressive format or the interlace format.

Here, the syntax of the sequence header area in which the display control information in units of sequences is described will be described in detail with reference to FIG. 7. In FIG. 7, things other than the syntax related to the embodiment are omitted.

The syntax header is encoded in the syntax configuration in seq_parameter_set_data( ). As the display control information in units of sequences, there are three parameters interlace_flag, continual_flag, and max_distance_num. These parameters are described in the area of vui_parameters( ) in which video information in the sequence headers is collected.

The parameter interlace_flag specifies whether the video format of the objective sequence is the progressive format or the interlace format. Specifically, interlace_flag has the value 0 in the case where the video format of the objective sequence is the progressive format and has the value 1 in the case where the video format of the objective sequence is the interlace format. However, interlace_flag is not limited to the above described configuration and may have the value 1 in the case of the progressive format and the value 0 in the case of the interlace format.

The parameter continual_flag specifies whether the positional relationship between the top field and the bottom field belonging to the same frame is always continual in the encoding order in the case where the video format of the objective sequence is the interlace format. Specifically, continual_flag has the value 0 in the case where the positional relationship between the top field and the bottom field belonging to the same frame is not always continual in the encoding order, and has the value 1 in the case where the positional relationship is always continual. That is, continual_flag is the value 1 in the case where such sort as described in FIG. 4 is performed, and has the value 0 in the case where such sort as described in FIG. 5 is performed. With the parameter, the corresponding decoding device is informed whether it is allowed to perform decoding and display control on always continual two pictures as a pair. That facilitates determination on possibility of decoding. However, continual_flag is not limited to the above described configuration and may have the value 1 in the case where the positional relationship between the top field and the bottom field belonging to the same frame is not always continual in the encoding order, and have the value 0 in the case where the positional relationship is always continual.

The parameter max_distance_num specifies the maximum number of pictures between the top field and the bottom field belonging to the same frame apart from each other in the encoding order in the case where continual_flag has the value 0. For example, in the case where such sort as described in FIG. 5 is performed, P_4 and B_8 is the combination by which the fields are the most apart from each other and the maximum number is four. With the parameter, the decoding device corresponding to the video encoding device 100 is allowed to determine the number of pictures which has to be waited for the top field and the bottom field belonging to the same frame to be continual. That facilitates determination of the capacity of the picture memory needed and the determination on possibility of decoding.

The parameter names and parameter values described here are merely examples and the other parameter names and parameter values may be used to realize the same functions. Further, not all of the parameters described here but only a part of the parameters may be used. Although an example in which each of the above described parameters is described in the area of vui_parameters( ) has been described here, each of the parameters may be described in any other area as far as the area allows the control information in units of sequences to be described.

Now, the syntax of the extended information area in which the display control information in units of pictures is described will be described in detail with reference to FIG. 8. In FIG. 8, things other than the syntax related to the embodiment are omitted.

The extended information area includes a group of parameters called SEI (Supplemental Enhancement Information). The parameter pic_timing_SEI( ) of FIG. 8 is one of the SEI and has a function of specifying decoding timing and display timing of the pictures to be encoded. As the display control information in units of pictures, there are two parameters pic_struct and field_pair_POC. These parameters are described in the area of pic_timing_SEI( ).

The parameter pic_struct is a parameter for specifying the display format of the pictures to be encoded. The parameter pic_struct has the value 0 in the case where the picture is to be displayed as a frame in the progressive format, the value 1 in the case where the picture is to be displayed as a top field of the interlace format, the value 2 in the case where the picture is to be displayed as a bottom field of the interlace format. In the case where the picture is to be displayed in another display, the parameter pic_struct has a corresponding value format. The parameter pic_struct is not limited to the above described configuration and may have the value 1 in the case where the picture is to be displayed as a frame in the progressive format, the value 0 in the case where the picture is to be displayed as a top field of the interlace format, the value 2 in the case where the picture is to be displayed as a bottom field of the interlace format. In the case where the picture is to be displayed in another display format, the parameter pic_struct has a corresponding value. That is, the parameter pic_struct may have any value as far as the value provides information specifying the case where the picture is to be displayed as a frame in the progressive format, the case where the picture is to be displayed as a top field of the interlace format, and the case where the picture is to be displayed as a bottom field of the interlace format.

The parameter field_pair_POC is information indicating the POCs of a pair of fields belonging to the same frame in the case where pic_struct specifies that the picture to be encoded is to be displayed as a top field or a bottom field of the interlace format. For example, in FIG. 4, in the case where the picture to be encoded is P_2, the picture to form a pair with P_2 is P_3, therefore, field_pair_POC is 7. Similarly, in FIG. 5, in the case where the picture to be encoded is B_8, the picture to form a pair with B_8 is P_4, therefore, field_pair_POC is 6. With the parameter, the corresponding decoding device is allowed to determine which of the pictures is the top field and the bottom field belonging to the same frame and, therefore, to perform display control corresponding to the interlace format.

Meanwhile, field_pair_POC may specify the POC value by a differential value of the POC instead of specifying the POC value as it is. For example, in FIG. 4, in the case where the picture to be encoded is P_2, the picture to form a pair with P_2 is P_3, therefore, field_pair_POC is 7−6=1. Similarly, in FIG. 5, in the case where the picture to be encoded is B_8, the picture to form a pair with B_8 is P_4, therefore, field_pair_POC is 6−7=−1. With the differential value like that, the picture to from a pair with the picture to be encoded can be specified with a less amount of code.

In the case where continual_flag described in FIG. 7 has the value 1, it is ensured that the top field and the bottom field belonging to the same frame are in positional relationship of always continual in the encoding order. Therefore, since the picture to form a pair with the picture to be encoded can be easily determined, field_pair_POC needs not to be described.

The parameters pic_struct and field_pair_POC which are the display control information in units of pictures may be described only in the case where the video format of the objective sequence is the interlace format. In that case, pic_struct only needs to be the information which can identify the case in which the encoding object is to be displayed as a top field and the case in which the encoding object is to be displayed as a bottom field.

The parameter names and parameter values described here are merely examples and the other parameter names and parameter values may be used to realize the same functions. Further, not all of the parameters described here but only a part of the parameters may be used. Although an example in which each of the above described parameters is described in the area of pic_timing_SEI( ) has been described here, each of the parameters may be described in any other area as far as the area allows the control information in units of pictures to be described.

5. Summarization 5-1. Configuration

The video encoding device 100 of the embodiment encodes the input video signals in units of pictures. The video encoding device 100 includes:

- the video format specifying unit 102 (video format information acquiring unit) which acquires video format information indicating whether the video format of the video signals is the interlace format or the progressive format;
- the display control information generator 103 which generates display control information to be used for displaying a video indicated by encoded video signals as a video in a video format indicated by the video format information based on the video format information;
- the picture setter 101 which, in the case where the video format information indicates the progressive format, sets a frame of the video signals as a picture and sorts the pictures in the encoding order, and in the case where the video format information indicates the interlace format, sets a field of the video signals as a picture and sorts the pictures in the encoding order;
- the picture data encoder 110 which generates a block layer code string by encoding pixel data included in a set picture for each block, which is a unit of encoding process, by using a common signal processing method and a common syntax structure which are not dependent on the video formats, further generates a slice layer code string by encoding the coding control information, which is applied in units of slices in encoding the pixel data, by using the common signal processing method and the common syntax structure which are not dependent on the video formats, and outputs a first code string which is acquired by that the block layer code string is associated with the slice layer code string;

the second code string generator 104 (picture upper layer encoder) which generates the picture upper layer code string by encoding the coding control information which is applied in units of pictures in encoding the pixel data, the coding control information which is applied in units of sequences, and the display control information; and the second code string generator 104 which outputs a second code string, the second code string being acquired by that the first code string is associated with the picture upper layer code string.

For example, the display control information generator 103 generates display control information including sequence unit display control information and picture unit display control information, the sequence unit display control information being commonly used in the display process of all pictures which belong to a sequence to be encoded and the picture unit display control information being individually used in the display process of a picture to be encoded.

For example, the second code string generator 104 (picture upper layer encoder) stores the sequence unit display control information in a video information area included in the sequence header which is generated in units of sequences in the picture upper layer code string.

For example, the second code string generator 104 (picture upper layer encoder) stores the sequence unit display control information of the same value in each extended information area of each picture belonging to the same sequence in the picture upper layer code string.

For example, the second code string generator 104 (picture upper layer encoder) stores the picture unit display control information in the extended information area which is generated in units of pictures in the picture upper layer code string.

For example, the display control information generator 103 generates the sequence unit display control information which includes a first identifier specifying whether the video signals to be encoded are in the progressive format or the interlace format.

For example, the display control information generator 103 generates the sequence unit display control information which includes a second identifier specifying whether two fields which belong to the same frame are always continual with each other in the encoding order in the sequence in the case where the video signals to be encoded is in the interlace format.

For example, the display control information generator 103 generates the sequence unit display control information which includes information indicating the maximum value of an interval between the first field and the second field which belong to the same frame in the encoding order in the sequence in the case where the video signals to be encoded are in the interlace format.

For example, the display control information generator 103 generates the picture unit display control information which includes a third identifier specifying that the picture to be encoded is (1) to be displayed as a frame which belongs to the progressive video signals, (2) to be displayed as a top field which belongs to the interlace video signals, (3) to be displayed as a bottom field which belongs to the interlace video signals, or (4) to be displayed in another display format in the display process of the picture to be encoded.

For example, the display control information generator 103 generates the picture unit display control information which includes a third identifier specifying that the picture to be encoded is (1) to be displayed as a top field which belongs to the interlace video signals or (2) to be displayed as a bottom field which belongs to the interlace video signals in the display process of the picture to be encoded only in the case where the video signals to be encoded are in the interlace format.

For example, the display control information generator 103 generates the picture unit display control information which includes specification information specifying a picture that is paired with the picture to be encoded and belongs to the same frame as that of the picture to be encoded in the case where the picture to be encoded is to be decoded and displayed as a top field or a bottom field which belongs to the interlace video signals.

For example, the display control information generator 103 describes, as the specification information, display order information which is assigned to the picture that is paired with the picture to be encoded and belongs to the same frame as that of the picture to be encoded.

For example, the display control information generator 103 describes, as the specification information, a difference value between the display order information which is assigned to the picture to be encoded and the display order information which is assigned to the picture that is paired with the picture to be encoded and belongs to the same frame as that of the picture to be encoded.

The video encoding method of the embodiment encodes the input video signals in units of pictures. The video encoding method comprising:

acquiring video format information indicating whether the video format of the video signals is the interlace format or the progressive format, generating display control information to be used for displaying encoded video signals as video signals in the video format indicated by the video format information based on the video format information, in the case where the video format information indicates the progressive format, setting a frame of the video signals as a picture and performing sort on the pictures in the encoding order and, on the other hand, in the case where the video format information indicates the interlace format, setting a field of the video signals as a picture and performing sort on the pictures in the encoding order, generating a block layer code string by encoding pixel data included in a set picture for each block, which is a unit of encoding process, by using a common signal processing method and a common syntax structure which are not dependent on the video formats, further generating a slice layer code string by encoding the coding control information, which is applied in units of slices in encoding the pixel data, by using the common signal processing method and the common syntax structure which are not dependent on the video formats, and outputting a first code string which acquired by that the block layer code string is associated with the slice layer code string, generating the picture upper layer code string by encoding the coding control information which is applied in units of pictures in encoding the pixel data, the coding control information which is applied in units of sequences, and the display control information, and outputting a second code string which is acquired by that the first code string is associated with the picture upper layer code string.

5-2. Effects and the Like

With the video encoding device 100 according to the embodiment, an encoding process is allowed to be performed on picture data under a common control with the processing amount being not increased both in the case where the progressive video is input and in the case where the interlace video is input, therefore, the video encoding device 100 facilitates implementation of a encoding device.

(Second Embodiment) (Decoding Process)

The second embodiment will be described with reference to the drawings.

1. Configuration of a Video Decoding Device

Figure 9:
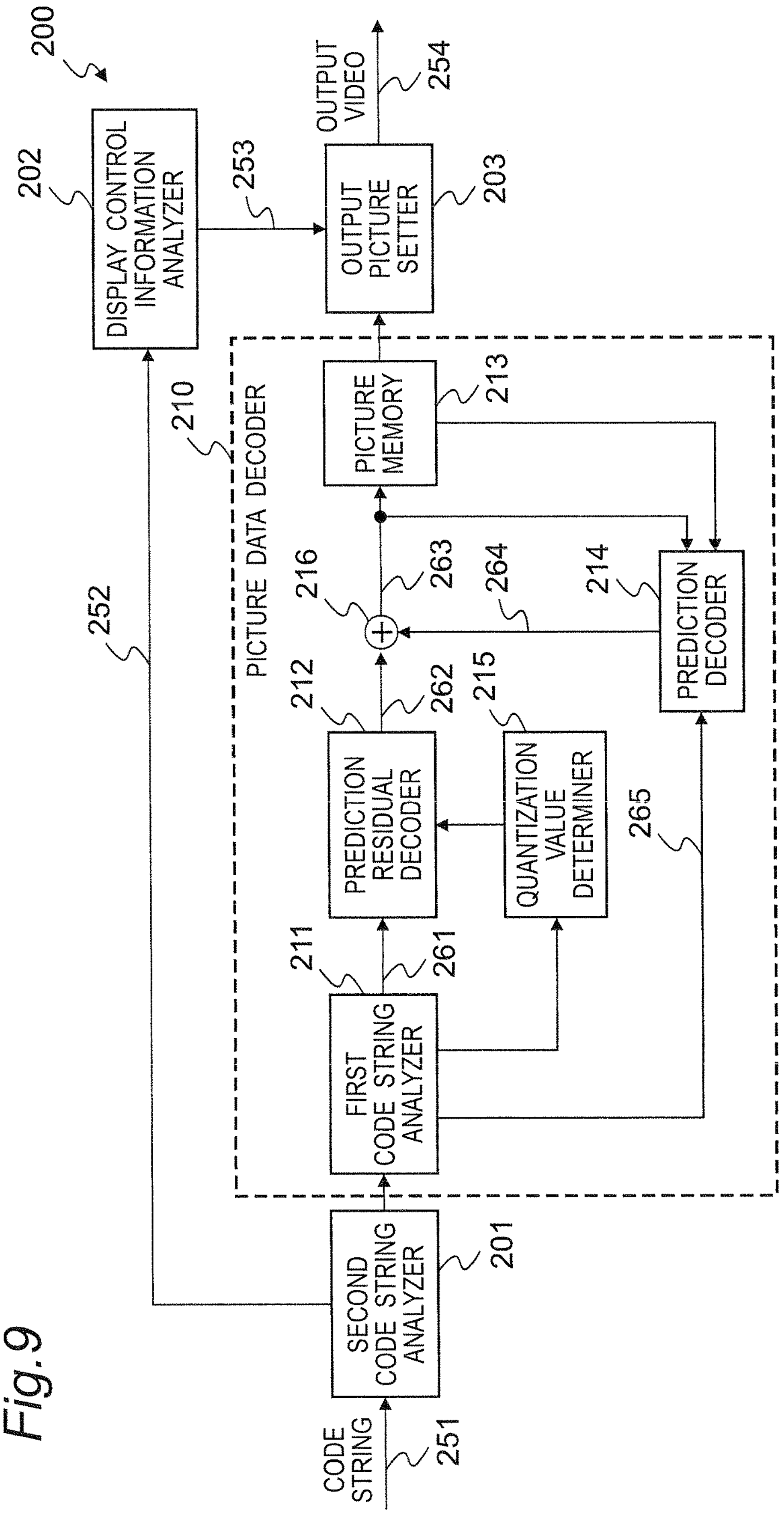
FIG. 9 is a block diagram illustrating a configuration of a video decoding device according to a second embodiment.

FIG. 9 is a block diagram of a video decoding device according to the embodiment.

The video decoding device 200 includes a second code string analyzer 201, a display control information analyzer 202, a picture data decoder 210, and an output picture setter 203. The picture data decoder 210 includes a first code string analyzer 211, a prediction residual decoder 212, a picture memory 213, a prediction decoder 214, and a quantization value determiner 215.

The second code string analyzer 201 extracts display control information and information about decoding control in units of sequences and decoding control in units of pictures from a code string of header information included in input code string signals 251. Then, the second code string analyzer 201 outputs the extracted information to the display control information analyzer 202 as display control information signals 252.

The picture data decoder 210 generates a decoded image of an objective picture by performing a decoding process in units of blocks on a code string of picture data included in the input code string signals 251. At this moment, a common decoding process is applied in units of pictures whether the video format is the progressive format or the interlace format and, further, the code string of the picture data to be decoded has a common syntax.

The display control information analyzer 202 analyzes the display control information signals 252 output from the second code string analyzer 201 to determine whether the video to be decoded is in the progressive format or the interlace format. Then, the display control information analyzer 202 outputs display control signals 253 based on the determination result to the output picture setter 203.

The output picture setter 203 sorts the decoded pictures generated by the picture data decoder 210 in an outputting order according to the display control signals 253 output from the display control information analyzer 202. Then, the output picture setter 203 outputs the pictures which have undergone the sort to outside as output video signals 254. The output video signals 254 may be in the progressive format and in the interlace format. In the case where the output video signals 254 are in the progressive format, display control is performed on a picture as a frame, and in the case where the output video signals 254 are in the interlace format, the display control is performed on a picture as a field.

Now, processes of the picture data decoder 210 will be described.

The first code string analyzer 211 performs analyzing of decoding control information and analyzing of the picture data in units of blocks by performing variable length decoding on the code string of picture data of the input code string signals 251. The first code string analyzer 211 outputs residual encoding signals 261 which are acquired as a result of analyzing, to the prediction residual decoder 212. Further, the first code string analyzer 211 outputs prediction information signals 265 which are acquired as a result of analyzing to the prediction decoder 214. Still further, the first code string analyzer 211 outputs quantization value information which is acquired as a result of analyzing to the quantization value determiner 215.

The prediction residual decoder 212 generates residual decoding signals 262 by performing inverse quantization and inverse orthogonal transform on the residual encoding signals 261 output from the first code string analyzer 211 and outputs the residual decoding signals 262 to an addition calculator 216. At this moment, the prediction residual decoder 212 performs inverse quantization on the residual encoding signals 261 by using a quantization value determined in the quantization value determiner 215.

The picture memory 213 stores reconstructed image signals 263 output from the addition calculator 216. The reconstructed image signals 263 are used as referential pixel data in a predictive decoding process in decoding of pictures after the pictures currently to be decoded. In response to a readout instruction from the prediction decoder 214, the picture memory 213 outputs the stored reconstructed image signals 263 to the prediction decoder 214 as pixel data. The reconstructed image signals 263 are concurrently output to the output picture setter 203 as a final output image.

The prediction decoder 214 generates predicted image signals 264 by using intra prediction or inter prediction based on the prediction information signals 265 output from the first code string analyzer 211 and outputs the predicted image signals 264 to the addition calculator 216. When the prediction decoder 214 uses the inter prediction, it uses the reconstructed image signals 263 of already decoded past pictures which have been stored in the picture memory 213. When the prediction decoder 214 uses the intra prediction, it uses the reconstructed image signals 263 of the current pictures of an already decoded block adjacent to the block to be decoded. Determination on whether to use the intra prediction or the inter prediction is performed according to the input prediction information signals 265.

The addition calculator 216 generates the reconstructed image signals 263 by adding the residual decoding signals 262 output from the prediction residual decoder 212 and the predicted image signals 264 output from the prediction decoder 214 and outputs the reconstructed image signals 263 to the picture memory 213.

2. Display Control Method

Figure 10:
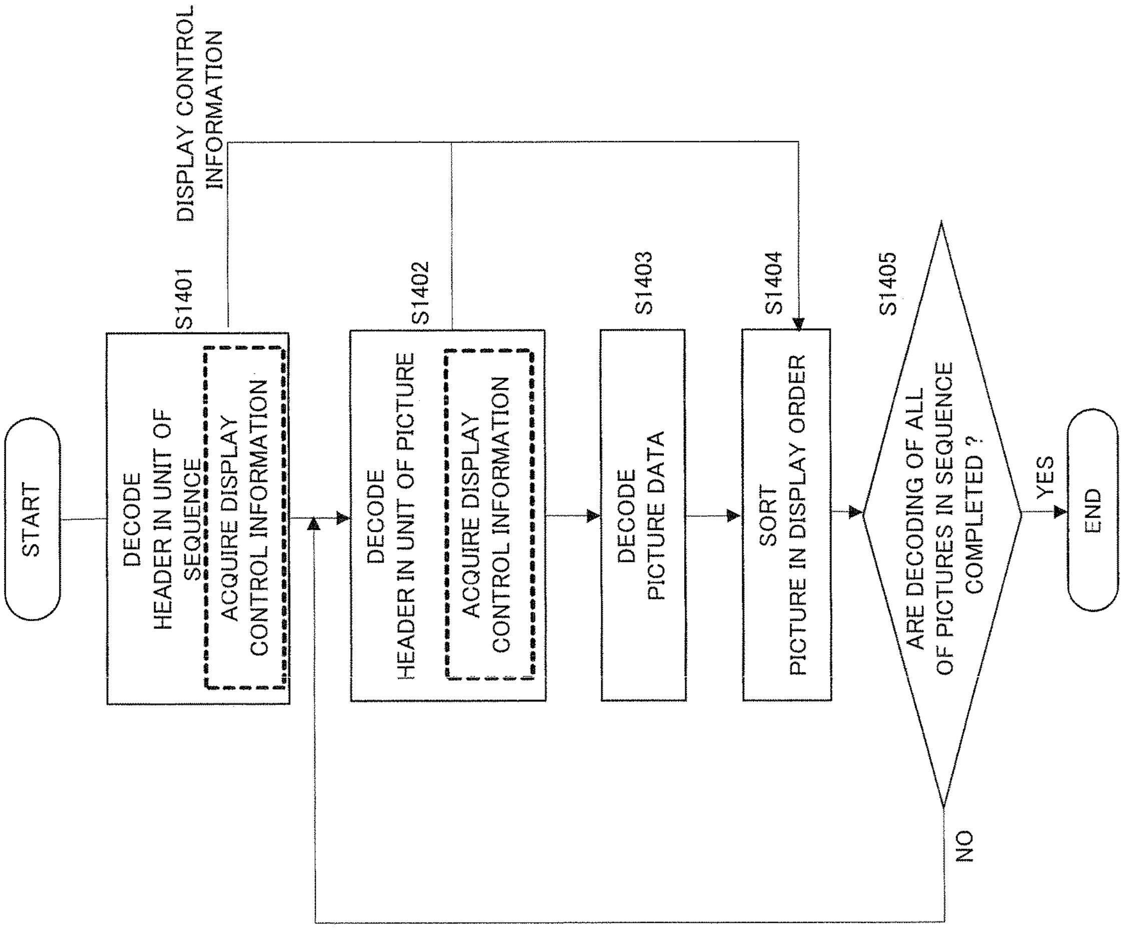
FIG. 10 is a flow chart of decoding process according to the second embodiment.

A method of analyzing the display control information in the display control information analyzer 202 and performing sort on the decoded pictures in an output order in the output picture setter 203 to be an output image will be described specifically with reference to the flow chart of the entire decoding process of FIG. 10.

First, the second code string analyzer 201 performs code string analyzing of header areas in units of sequences (S1401). At this moment, the display control information analyzer 202 acquires the display control information in units of sequences.

Next, the second code string analyzer 201 performs code string analyzing of header areas in units of pictures (S1402). At this moment, the display control information analyzer 202 acquires the display control information in units of pictures.

Next, the picture data decoder 210 performs a series of decoding process described with reference to FIG. 9 to generate a decoded image of the objective pictures (S1403). Meanwhile, in step S1403, a common decoding process is applied without depending on whether the video format is the progressive format or the interlace format.

Next, the output picture setter 203 sorts the decoded image which is stored in a decoding order in a display order and a process of selecting a picture to be displayed (S1404). At this moment, the output picture setter 203 sorts the pictures according to a display control method acquired as a result of analyzing by the display control information analyzer 202.

Next, when the processes on the currently processed picture to be decoded are completed, the operation returns to step S1402 to proceed to the decoding process of the next picture, and the processes from step S1402 to step S1404 are repeated until the decoding processes of all of the pictures in the sequence are completed (51405).

3. Sort of Pictures

A sort process of pictures in step S1404 will be described in detail with reference to FIGS. 11, 12, and 13.

Figure 11:
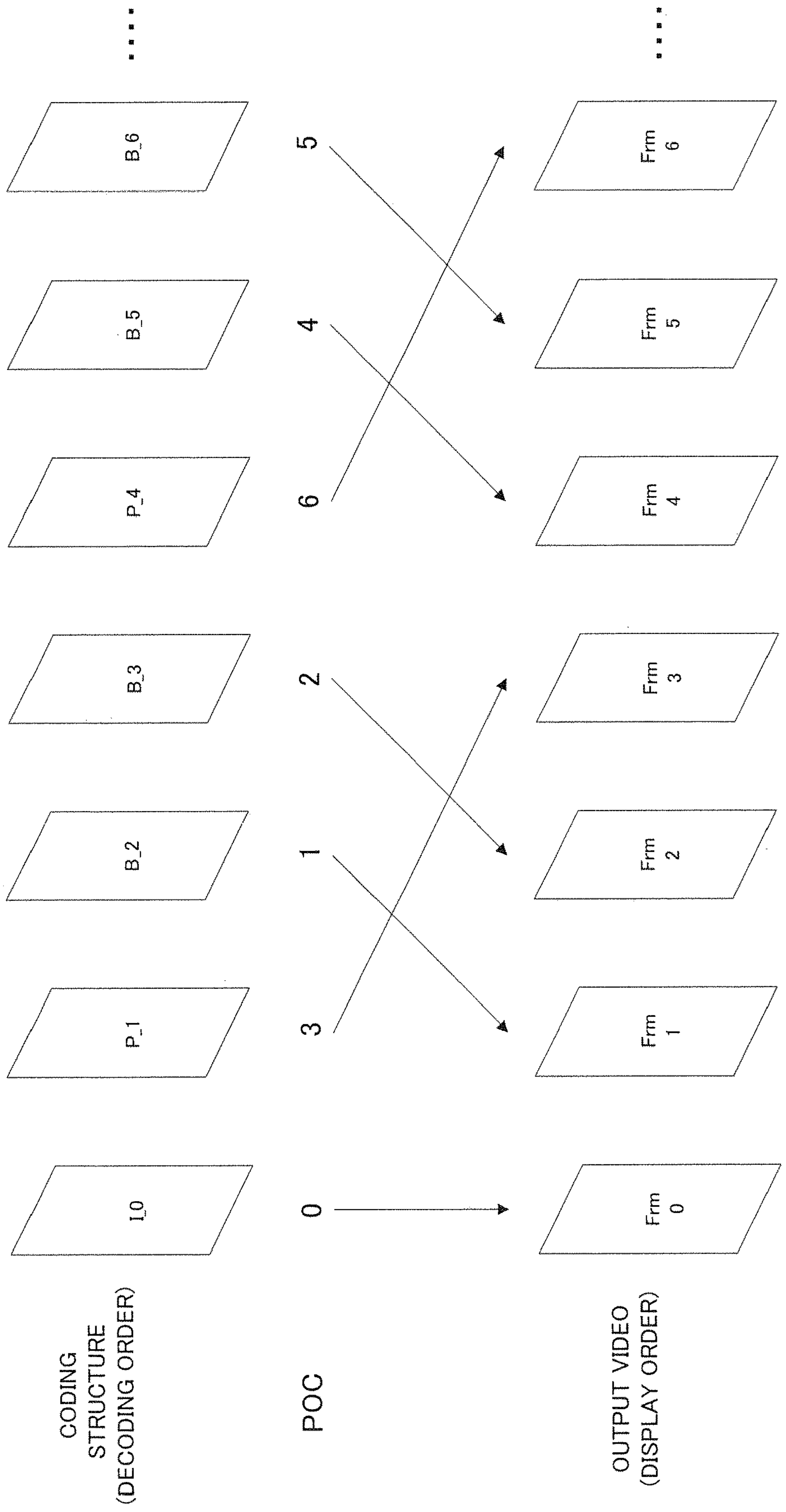
FIG. 11 is a conceptual diagram for describing an example of a method of sort in a progressive decoded video in a display order according to the second embodiment.

A method illustrated in FIG. 11 is an example of a sort method of pictures in the case where the video format is the progressive format. This sort method is the reverse of the sort process for the progressive format performed in the encoding device described with reference to FIG. 3, and in the sort method, each of the decoded pictures is always sorted as a frame and displayed.

Figure 12:
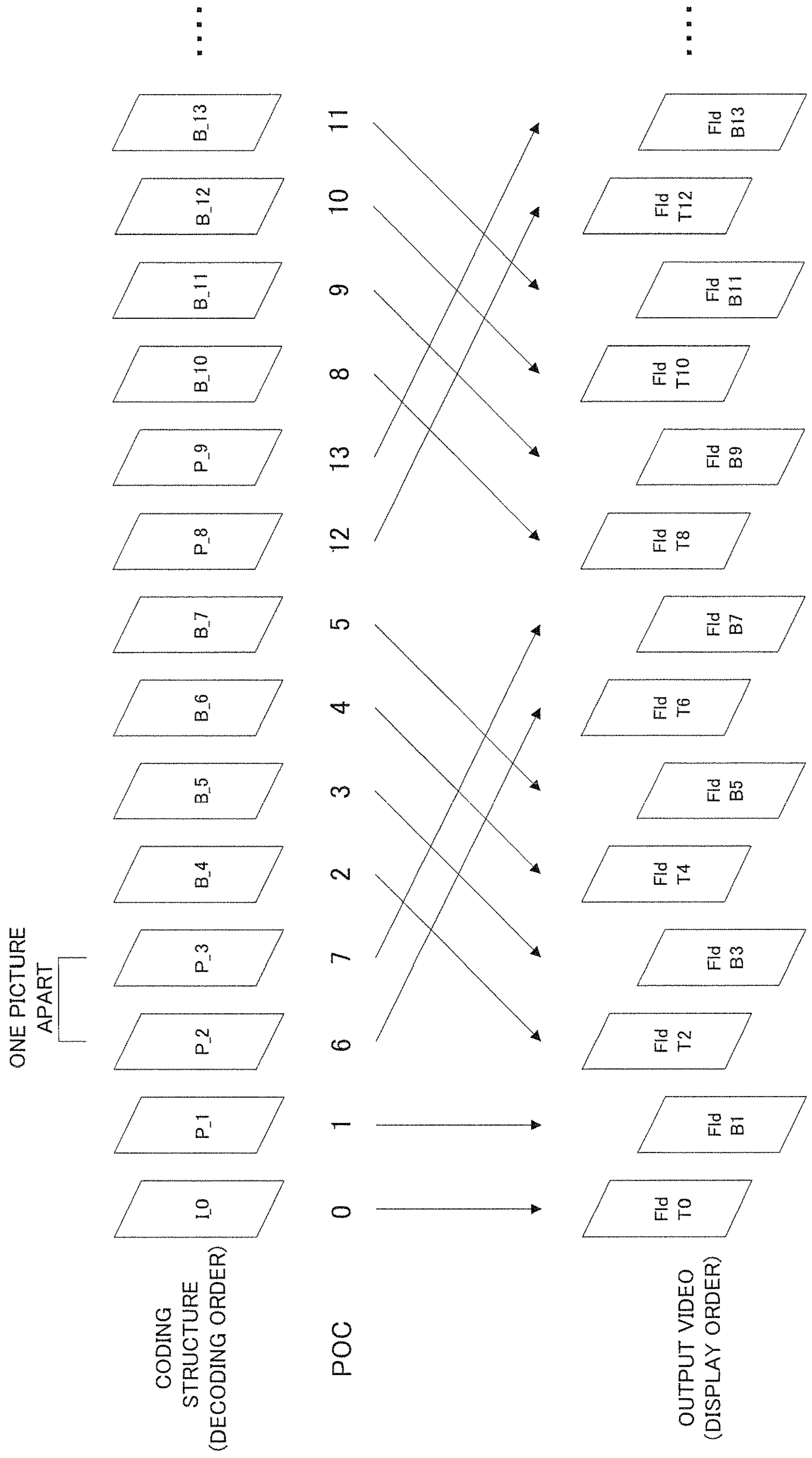
FIG. 12 is a conceptual diagram for describing an example of a method of sort in an interlace decoded video in a display order according to the second embodiment.
Figure 13:
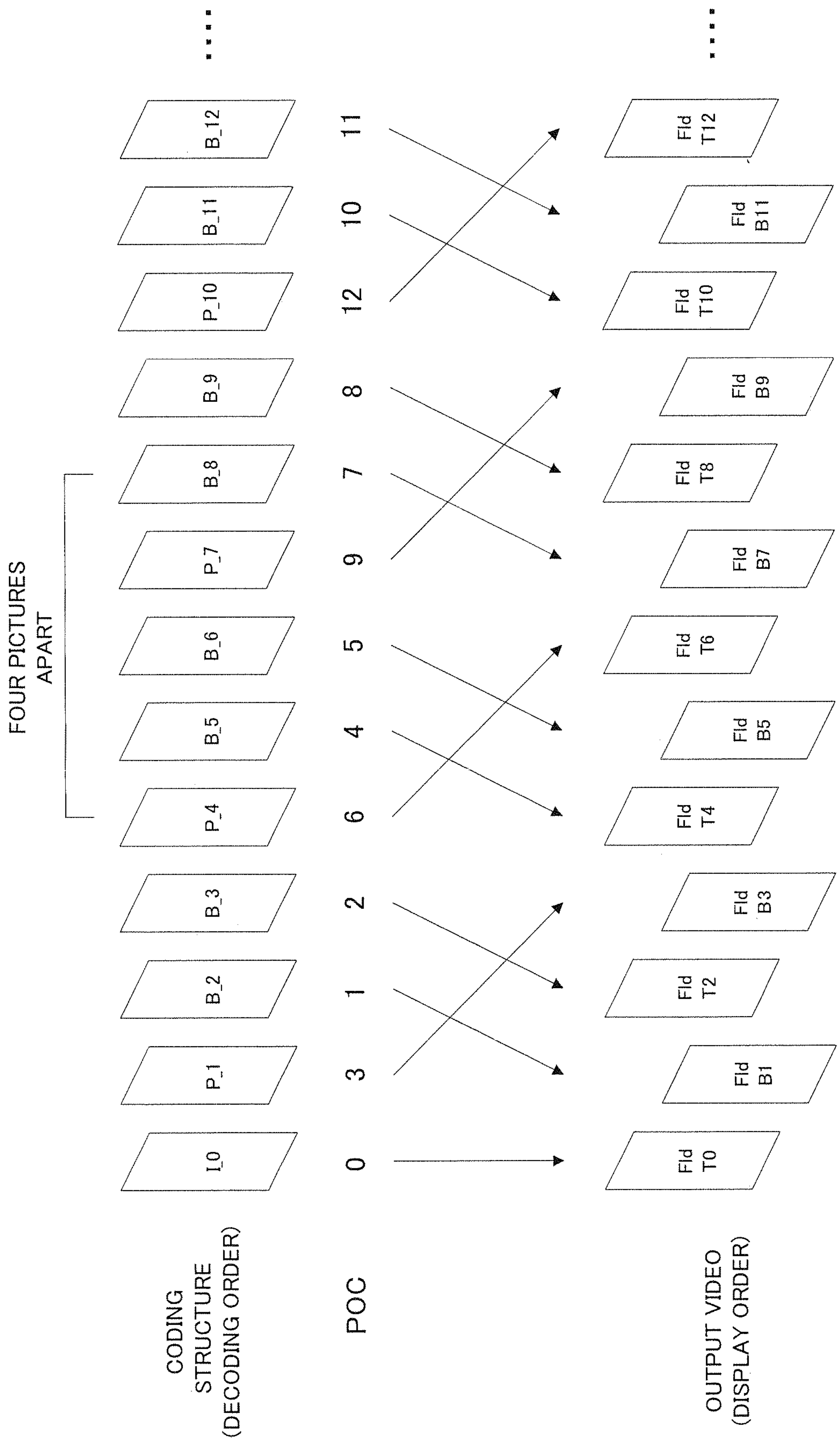
FIG. 13 is a conceptual diagram for describing another example of a method of sort in the interlace decoded video in a display order according to the second embodiment.

On the other hand, methods illustrated in FIGS. 12 and 13 are examples of a sort method of pictures in the case where the video format is the interlace format. These sort methods are the reverse of the sort processes for the interlace format performed in the encoding device described with reference to FIGS. 4 and 5, and in the sort methods, each of the decoded pictures is always sorted as a field and displayed.

In FIG. 12, the top field and the bottom field belonging to a frame are always paired in the sort. For example, P_2 and P_3 undergo the sort as FldT6 and FldB7, so that they are always continual with each other in the display order. That applies to all of the other pictures. With the above described sort performed, the decoded top field and bottom field are allowed to be continually transferred to the display process and a memory management process in the output picture setter 203 can be simplified.

In contrast, in FIG. 13, the sort is performed regardless of which frame the top field and the bottom field belong to. In a coding structure alone, FIG. 13 is completely in the same structure as that in the case of the progressive format described in FIG. 11, but P_4 and B_8, for example, are sorted to be FldT6 and FldB7, therefore, the two fields which have apart from each other by four pictures in the decoding order need to undergo the sort to be paired. Also for the other pictures, the two pictures which have become apart from each other by one picture to four pictures in the decoding order have undergone the sort to be paired. With the above described sort, the pictures are allowed to undergo the process in completely the same decoding order both in the progressive format and the interlace format. However, it is needed to transfer the decoded top field and bottom field to the display process with the fields shifted by maximum of four pictures, which complicates the memory management process in the output picture setter 203.

In the picture memory 213, for the purpose of limiting the memory capacity, a process for ensuring an area for pictures to be stored is performed in such a manner as deleting a picture which has become unnecessary among the stored pictures from the memory. At this moment, the picture which meets two conditions that (1) the picture is no longer used as referential pixel data in the predictive encoding process and that (2) the picture has already been transferred to the display process can be deleted. That is, in the case where the video format is the interlace format, when the decoding process on the pictures of both the top field and the bottom field belonging to a frame has completed and the display process on both of the pictures has completed, the pictures can be deleted from the picture memory 213.

4. Configuration and Syntax of the Code String

Figure 6:
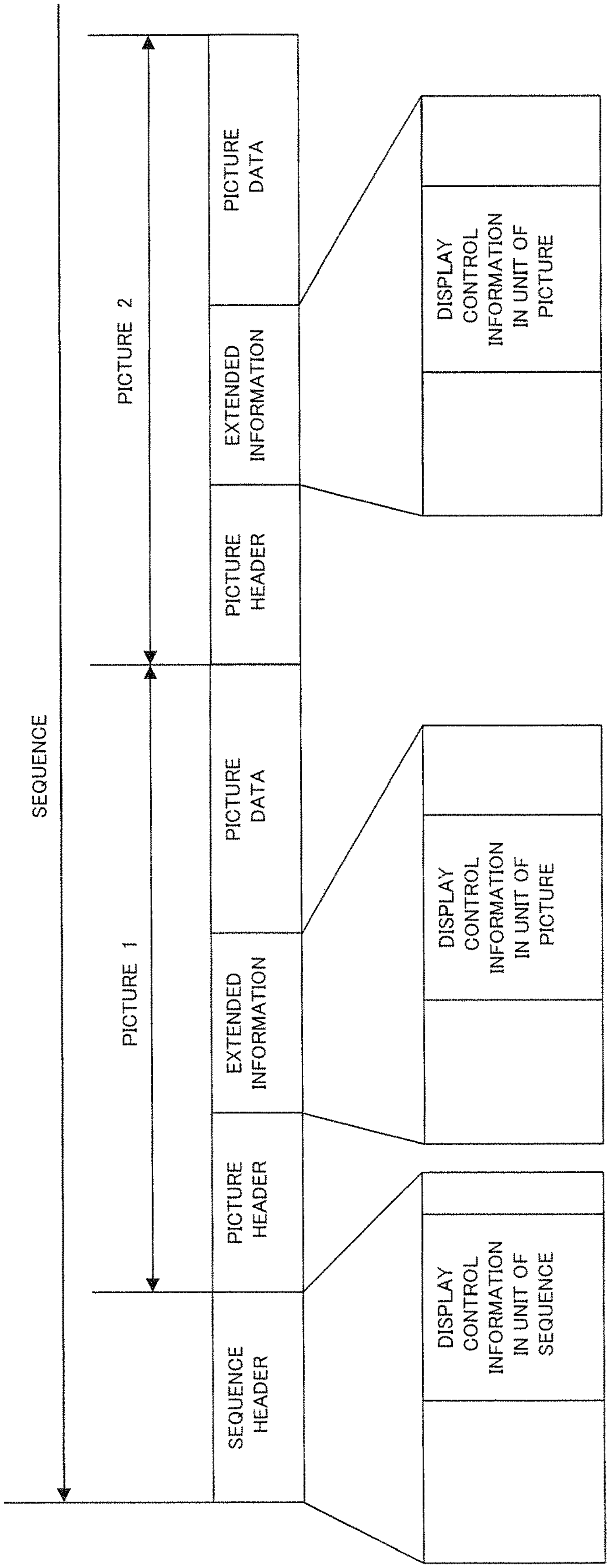
FIG. 6 is a conceptual diagram for describing a configuration of a code string generated by the embodiment.

Since the configuration and syntax of the code string to be decoded in the embodiment are completely the same as those described in the first embodiment with reference to FIGS. 6 to 8, the description of them will be omitted here.

5. Summarization 5-1. Configuration

A video decoding device 200 of the embodiment decodes a code string in units of pictures, the code string being acquired as a result of encoding video signals in an interlace video format or a progressive video format in units of pictures. The video decoding device 200 includes:

- the second code string analyzer 201 which analyzes the code string to acquire a picture upper layer code string and a first code string;
- the second code string analyzer 201 (picture upper layer decoder) which acquires, from the picture upper layer code string, coding control information used in encoding the video signals and display control information to be used for displaying decoded pictures;
- the picture data decoder 210 which decodes the first code string for each block, which is a unit of decoding process, to acquire the picture by using common syntax analyzing method, a common signal processing method, and information commonly used in encoding regardless of the video format among the coding control information, which are not dependent on the video formats; and
- the output picture setter 203 which, in the case where the display control information indicates the progressive format, sets the acquired picture as a frame and outputs the frame one by one in a display order, and in the case where the display control information indicates the interlace format, sets the acquired picture as a field and outputs a pair of top field and bottom field in a display order when the pair of top field and bottom field are acquired.

For example, the second code string analyzer 201 (picture upper layer decoder) includes sequence unit display control information and picture unit display control information, the sequence unit display control information being commonly used in a display process of all pictures which belong to a sequence to be decoded and the picture unit display control information being individually used in a display process of a picture to be decoded.

For example, the second code string analyzer 201 (picture upper layer decoder) acquires the sequence unit display control information in a video information area included in the sequence header which is analyzed in units of sequences in the picture upper layer code string.

For example, each extended information area of each picture unit which belongs to the same sequence stores the sequence unit display control information of the same value.

For example, the second code string analyzer 201 (picture upper layer decoder) acquires the picture unit display control information from the extended information area which is analyzed in units of pictures in the picture upper layer code string.

For example, the second code string analyzer 201 (picture upper layer decoder) acquires the sequence unit display control information which includes a first identifier specifying whether the video signals to be decoded are in the progressive format or the interlace format, and

- the output picture setter 203 changes an output method of the picture based on the acquired first identifier.

For example, in the case where the video signals to be decoded are in the interlace format, the second code string analyzer 201 (picture upper layer decoder) acquires the sequence unit display control information which includes a second identifier specifying whether two fields which belong to the same frame are always continual with each other in the decoding order in the sequence, and the output picture setter 203 changes the output method of the picture based on the acquired second identifier.

For example, in the case where the video signals to be decoded are in the interlace format, the second code string analyzer 201 (picture upper layer decoder) acquires the sequence unit display control information which includes information indicating the maximum value of an interval between the first field and the second field which belong to the same frame in the decoding order in the sequence, and the output picture setter 203 changes the output method of the picture based on the acquired information indicating the maximum value.

For example, the second code string analyzer 201 (picture upper layer decoder) acquires the picture unit display control information which includes a third identifier specifying that the picture to be decoded is (1) to be displayed as a frame which belongs to the progressive video signals, (2) to be displayed as a top field which belongs to the interlace video signals, (3) to be displayed as a bottom field which belongs to the interlace video signals, or (4) to be displayed in another display format in the display process of the picture to be decoded, and the output picture setter 203 changes the output method of the picture based on the acquired third identifier.

For example, the second code string analyzer 201 (picture upper layer decoder) acquires the picture unit display control information which includes a third identifier specifying that the picture to be decoded is (1) to be displayed as a top field which belongs to the interlace video signals or (2) to be displayed as a bottom field which belongs to the interlace video signals in the display process of the picture to be decoded only in the case where the video signals to be decoded are in the interlace format, and the output picture setter 203 changes the output method of the picture based on the acquired third identifier.

For example, the second code string analyzer 201 (picture upper layer decoder) acquires the picture unit display control information which includes specification information specifying a picture that is paired with the picture to be decoded and belongs to the same frame as that of the picture to be decoded in the case where the picture to be decoded is to be displayed as a top field or a bottom field which belongs to the interlace video signals, and the output picture setter 203 outputs the picture to be decoded by setting the picture to be decoded as paired with the picture specified in the specification information.

For example, the second code string analyzer 201 (picture upper layer decoder) acquires, as the specification information, display order information which is assigned to the picture that is paired with the picture to be decoded and belongs to the same frame as that of the picture to be decoded.

For example, the second code string analyzer 201 (picture upper layer decoder) acquires, as the specification information, a difference value between the display order information which is assigned to the picture to be decoded and the display order information which is assigned to the picture that is paired with the picture to be decoded and belongs to the same frame as that of the picture to be decoded.

A video decoding method of the embodiment decodes a code string in units of pictures, the code string being acquired as a result of encoding video signals in an interlace video format or a progressive video format in units of pictures. The video decoding method comprising:

analyzing the code string to acquire a picture upper layer code string and a first code string, acquiring, from the picture upper layer code string, coding control information used in encoding the video signals and display control information to be used for displaying decoded pictures, decoding the first code string for each block, which is a unit of decoding process, to acquire the picture by using common syntax analyzing method, a common signal processing method, and information commonly used in encoding regardless of the video format among the coding control information, which are not dependent on the video formats, and in the case where the display control information indicates the progressive format, setting the acquired picture as a frame and outputting the frame one by one in a display order, and in the case where the display control information indicates the interlace format, setting the acquired picture as a field and outputting a pair of top field and bottom field in a display order when the pair of top field and bottom field are acquired.

5-2. Effects and the Like

With the video decoding device 200 according to the embodiment, a decoding process and display control are allowed to be performed on picture data under a common control with the processing amount being not increased for both a code string which is acquired as a result of encoding a progressive video and a code string which is acquired as a result of encoding an interlace video. That facilitates implementation of a decoding device.

(Third Embodiment) (Another Example of Encoding Process)

The third embodiment will be described with reference to the drawings.

1. Configuration of a Video Encoding Device

Figure 14:
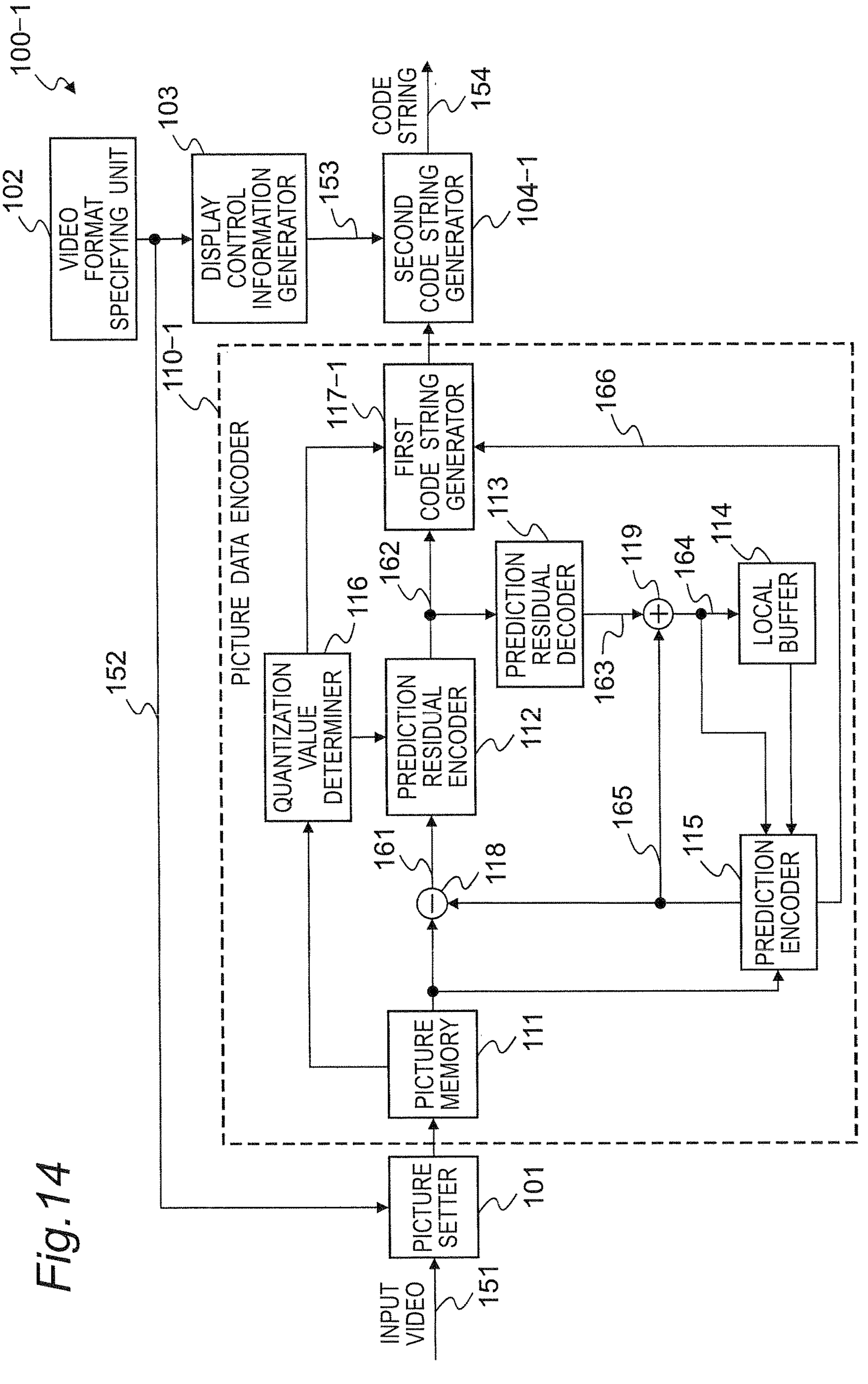
FIG. 14 is a block diagram illustrating a configuration of a video encoding device according to a third embodiment.

FIG. 14 is a block diagram of a video encoding device according to the embodiment.

The video encoding device 100-1 includes a picture data encoder 110-1 and a second code string generator 104-1 in place of the picture data encoder 110 and the second code string generator 104 of the video encoding device 100 of the first embodiment. The picture data encoder 110-1 includes a first code string generator 117-1 in place of the first code string generator 117.

For convenience of the description, a detailed description of the same configuration as that of the first embodiment will be omitted below. Further, in FIG. 14, blocks which have the same functions as those of the blocks in FIG. 1 are denoted by the same numbers as the blocks in FIG. 1.

The picture data encoder 110-1 divides each picture input from the picture setter 101 into blocks and performs an encoding process in units of blocks to generate a code string of picture data. At this moment, a common encoding process is applied in units of pictures without depending on whether the video format is the progressive format or the interlace format and, the generated code string of the picture data has a common syntax. Also in the embodiment, the picture data encoder 110-1 generates a code string of sequence header and a code string of picture header.

The first code string generator 117-1 generates the code string of picture data by performing variable length coding on the residual encoding signals 162 output from the prediction residual encoder 112, prediction information signals 166 output from the prediction encoder 115, the quantization value output from the quantization value determiner 116, and information about the other encoding control. In the embodiment, the first code string generator 117-1 encodes information about encoding control in units of sequences and encoding control in units of pictures as header information to generate the code string of sequence header and the code string of picture header.

The second code string generator 104-1 encodes the display control information signals 153 output from the display control information generator 103 to generate an extended information area code string. The display control information signals 153 include the display control information in units of sequences and the display control information in units of pictures. Further, the second code string generator 104-1 associates the generated extended information area code string and the code string generated by the picture data encoder 110, the code string of picture data including a sequence header, a picture header, and picture data, to generate the code string signals 154 to be finally output.

2. Generation Method of Display Control Information

Figure 15:
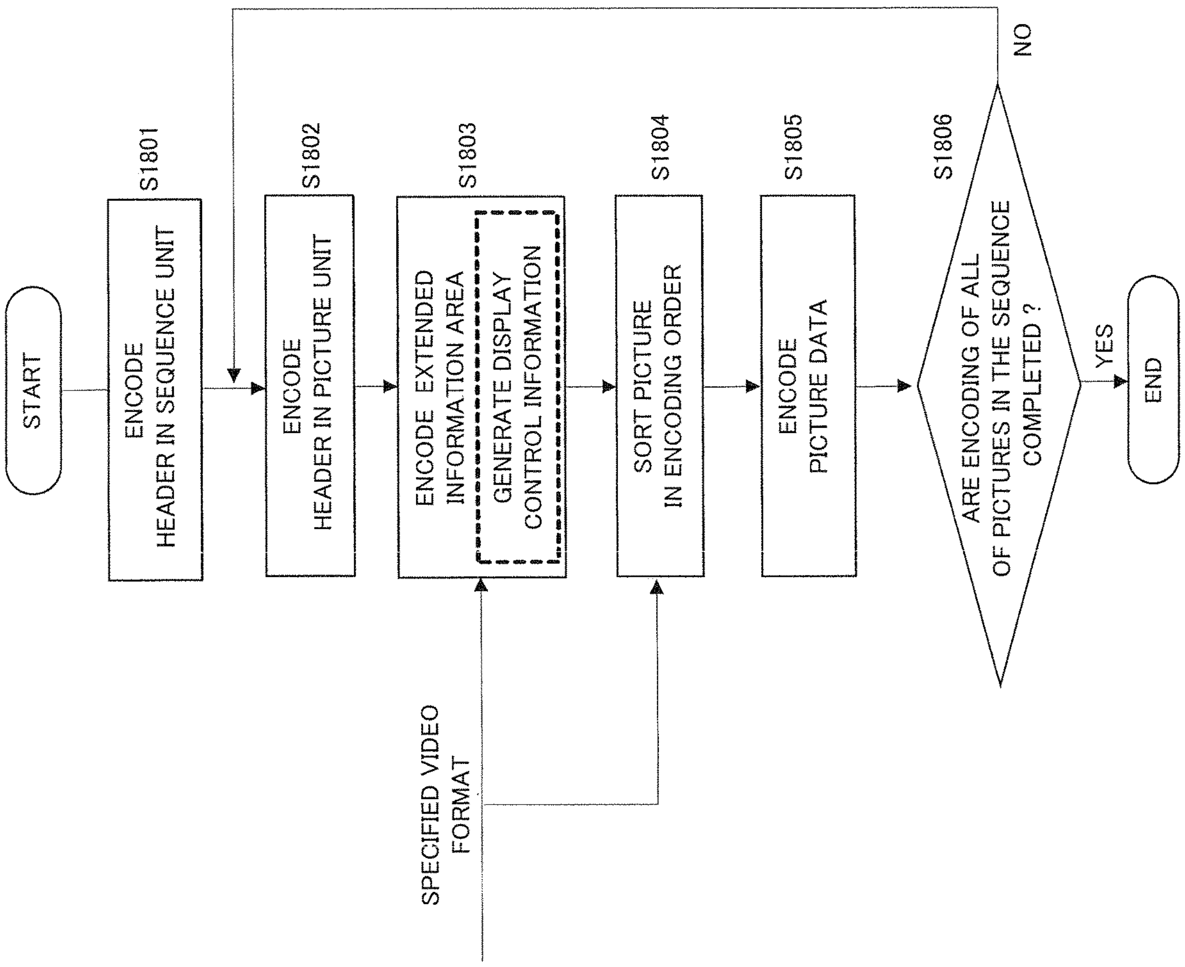
FIG. 15 is a flow chart of encoding process according to the third embodiment.

A method of generating the display control information signals 153 in the display control information generator 103 and describing the display control information signals 153 in a code string in the second code string generator 104-1 and a method of sort in an input video in an encoding order in the picture setter 101 when the video format signals 152 are received from the video format specifying unit 102 will be described specifically with reference to the flow chart of the entire encoding process of FIG. 15.

First, the first code string generator 117-1 performs code string generation on header areas in units of sequences (S1801).

Next, the first code string generator 117-1 performs code string generation on header areas in units of pictures (S1802).

Next, the display control information generator 103 generates display control information in units of sequences and display control information in units of pictures according to the video format specified by the video format specifying unit 102 (S1803). The second code string generator 104-1 encodes and describes the respective kinds of display control information in the extended information area in the code string.

Next, the picture setter 101 sorts the input picture which is input in a display order in an encoding order and selects a picture to be encoded (S1804). At this moment, the picture setter 101 sorts the pictures according to the video format specified by the video format specifying unit 102.

Next, the picture data encoder 110-1 performs the above described series of encoding process to generate a code string of picture data (S1805). Meanwhile, in step S1805, a common encoding process is applied without depending on whether the video format is the progressive format or the interlace format.

Next, when the processes on the currently processed picture to be encoded are completed, the operation returns to step S1802 to proceed to the encoding process of the next picture, and the processes from step S1802 to step S1805 are repeated until the encoding processes of all of the pictures in the sequence are completed (S1806).

3. Sort of Pictures

As for the sort process of pictures in step S1804, the same processes as those described with reference to FIGS. 3, 4, and 5 in the first embodiment are performed. Therefore, the description of the process will be omitted.

4. Configuration and Syntax of the Code String

Now, a configuration of the code string generated by the embodiment will be described with reference to FIG. 16.

The generated code string includes a sequence header area in which coding control information in units of sequences is described, a picture header area in which coding control information in units of pictures is described, an extended information area in which auxiliary information in units of pictures is described, and picture data. Both of the display control information in units of sequences and the display control information in units of pictures are described in the extended information area. The respective types of information other than the display control information are described in the code string of a common syntax without depending on whether the input video format is the progressive format or the interlace format.

Now, the syntax of the extended information area in which the display control information in units of sequences and the display control information in units of pictures are described will be described in detail with reference to FIG. 17. In FIG. 17, things other than the syntax related to the embodiment are omitted.

In FIG. 17, all of interlace_flag, continual_flag, max_distance_flag, pic_struct, and field_pair_POC are described in pic_timing_SEI( ). Since details of the parameters are completely the same as those described in FIGS. 7 and 8, the descriptions will be omitted here.

Since the extended information area is encoded for each of the pictures, as for interlace_flag, continual_flag, and max_distance_flag of the display control information in units of sequences, the same values are always repeated for each picture in the sequence although it is redundant. However, with all of the display control information described collectively as illustrated in FIG. 17, all of the syntax areas other than the extended information area may be in a common syntax without depending on whether the video format is the progressive format or the interlace format. Therefore, the encoding process can be further simplified.

The parameter names and parameter values described here are merely examples and the other parameter names and parameter values may be used to realize the same functions. Further, not all of the parameters described here but only a part of the parameters may be used. Although an example in which each of the above described parameters is described in the area of pic_timing_SEI( ) has been described here, each of the parameters may be described in any other area as far as the area allows the control information in units of pictures to be described.

5. Summarization 5-1. Configuration

The video encoding device 100-1 of the embodiment encodes the input video signals in units of pictures. The video encoding device 100-1 includes:

- the video format specifying unit 102 (video format information acquiring unit) which acquires video format information indicating whether the video format of the video signals is the interlace format or the progressive format;
- the display control information generator 103 which generates display control information to be used for displaying a video indicated by encoded video signals as a video in a video format indicated by the video format information based on the video format information;

the picture setter 101 which, in the case where the video format information indicates the progressive format, sets a frame of the video signals as a picture and sorts the pictures in the encoding order, and in the case where the video format information indicates the interlace format, sets a field of the video signals as a picture and sorts the pictures in the encoding order;

the picture data encoder 110-1 which outputs a first code string by encoding the pixel data included in the set picture by using a common signal processing method and a common syntax structure which are not dependent on the video formats;

the second code string generator 104-1 (extended information area encoder) encodes the display control information to generate the extended information area code string; and the second code string generator 104-1 which outputs a second code string, the second code string being acquired by that the first code string is associated with the extended information area code string, wherein the display control information includes sequence unit display control information and picture unit display control information, the sequence unit display control information being commonly used in a display process of all pictures which belong to a sequence to be encoded and the picture unit display control information being individually used in a display process of a picture to be encoded, and the second code string generator 104-1 (extended information area encoder) stores the extended information area code string in the extended information area which is generated in units of pictures.

For example, the second code string generator 104-1 (extended information area encoder) stores the sequence unit display control information of the same value in each extended information area of each picture belonging to the same sequence.

For example, the display control information generator 103 generates the sequence unit display control information which includes a first identifier specifying whether the video signals to be encoded are in the progressive format or the interlace format.

For example, the display control information generator 103 generates the sequence unit display control information which includes a second identifier specifying whether two fields which belong to the same frame are always continual with each other in the encoding order in the sequence in the case where the video signals to be encoded is in the interlace format.

For example, the display control information generator 103 generates the sequence unit display control information which includes information indicating the maximum value of an interval between the first field and the second field which belong to the same frame in the encoding order in the sequence in the case where the video signals to be encoded are in the interlace format.

For example, the display control information generator 103 generates the picture unit display control information which includes a third identifier specifying that the picture to be encoded is (1) to be displayed as a frame which belongs to the progressive video signals, (2) to be displayed as a top field which belongs to the interlace video signals, (3) to be displayed as a bottom field which belongs to the interlace video signals, or (4) to be displayed in another display format, in the display process of the picture to be encoded.

For example, the display control information generator 103 generates the picture unit display control information which includes a third identifier specifying that the picture to be encoded is (1) to be displayed as a top field which belongs to the interlace video signals or (2) to be displayed as a bottom field which belongs to the interlace video signals in the display process of the picture to be encoded only in the case where the video signals to be encoded are in the interlace format.

For example, the display control information generator 103 generates the picture unit display control information which includes specification information specifying a picture that is paired with the picture to be encoded and belongs to the same frame as that of the picture to be encoded in the case where the picture to be encoded is to be decoded and displayed as a top field or a bottom field which belongs to the interlace video signals.

For example, the display control information generator 103 describes, as the specification information, display order information which is assigned to the picture that is paired with the picture to be encoded and belongs to the same frame as that of the picture to be encoded.

For example, the display control information generator 103 describes, as the specification information, a difference value between the display order information which is assigned to the picture to be encoded and the display order information which is assigned to the picture that is paired with the picture to be encoded and belongs to the same frame as that of the picture to be encoded.

The video encoding method of the embodiment encodes the input video signals in units of pictures. The video encoding method comprises:

acquiring video format information indicating whether the video format of the video signals is the interlace format or the progressive format, generating display control information to be used for displaying the video indicated by the encoded video signals as a video in the video format indicated by the video format information based on the video format information, in the case where the video format information indicates the progressive format, performing sort on a plurality of frames included in the video signals in the encoding order and also setting each of the plurality of frames as a picture, and in the case where the video format information indicates the interlace format, performing sort on a plurality of fields included in the video signals in the encoding order and also setting each of the plurality of fields as a picture, outputting a first code string by encoding the pixel data included in the set picture by using a common signal processing method and a common syntax structure which are not dependent on the video formats, encoding the display control information to generate the extended information area code string, outputting a second code string which is acquired by that the first code string is associated with the extended information area code string, wherein the display control information includes sequence unit display control information and picture unit display control information, the sequence unit display control information being commonly used in a display process of all pictures which belong to a sequence to be encoded and the picture unit display control information being individually used in a display process of a picture to be encoded, and storing each of the sequence unit display control information and the picture unit display control information in the extended information area which is generated in units of pictures.

5-2. Effects and the Like

With the video encoding device 100-1 according to the embodiment, an encoding process is allowed to be performed on picture data under a common control with the processing amount being not increased both in the case where the progressive video is input and in the case where the interlace video is input, therefore, the video encoding device 100-1 facilitates implementation of a encoding device.

Generally, in a video decoding device, a decoding process for decoding an encoded code string to generate a decoded image and a display process for displaying the generated decoded image on a corresponding display device by adapting the image to the device are controlled as different levels. For example, such a method is possible that the former process is formed by hardware and the latter process is formed by software. The method can reduce the man-hours for development, for example, in developing the devices which are different in the display method such as a television set and a personal computer, by using common hardware for performing the decoding process and only creating software programs for performing the display process respectively for the devices.

Figure 16:
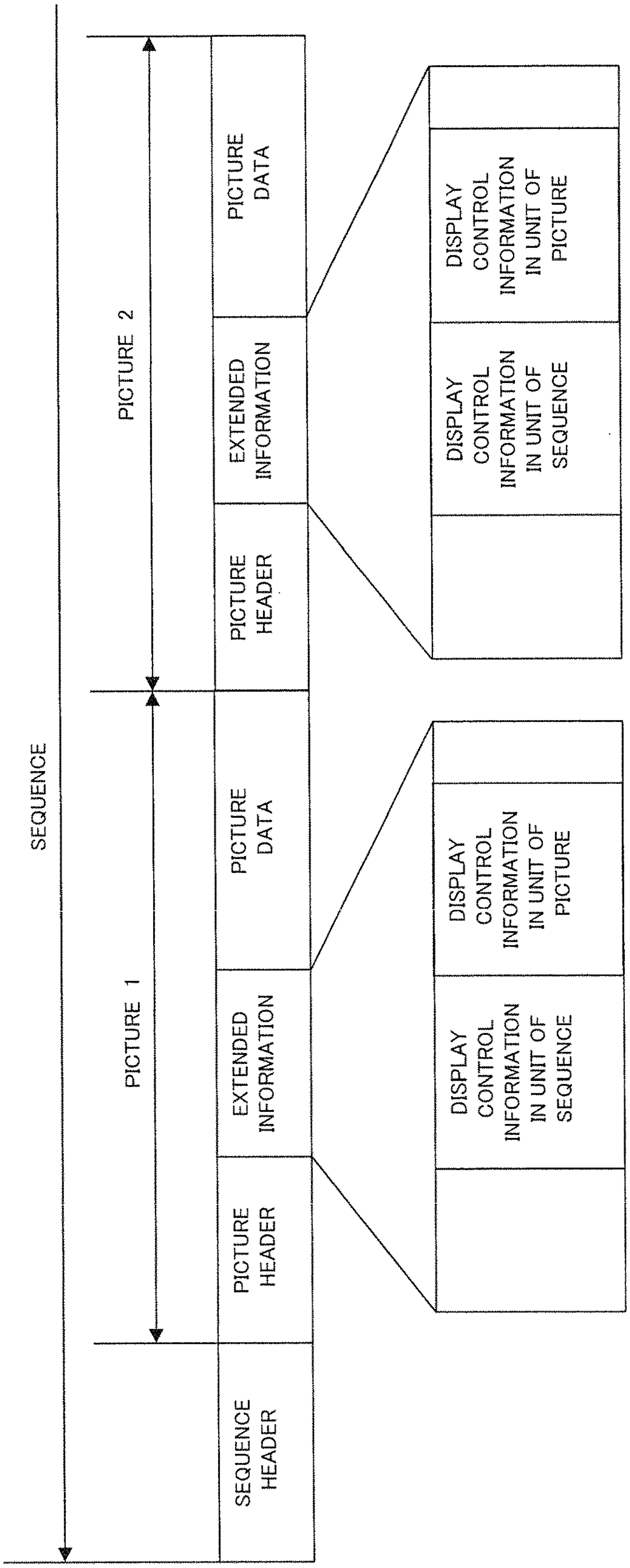
FIG. 16 is a conceptual diagram for describing a configuration of a code string generated by the third embodiment.

In the embodiment, the extended information area in which only the information unnecessary for the encoding process (display control information, and the like) is described and the other areas in which information necessary for the decoding process is described are completely separated as in the code string described in FIG. 16. As a result, the present disclosure facilitates sending of only the code strings needed by respective levels of the level of performing the decoding process and the level of performing the display process to the respective levels for the purpose like the above described use, therefore, improves independence of each level. That is, it allows to form the level of performing the decoding process (hardware) by using completely the common components in both the decoding device which supports the progressive format and the decoding device which supports the interlace format.

(Fourth Embodiment) (Another Example of Decoding Process)

The fourth embodiment will be described with reference to the drawings.

1. Configuration of a Video Decoding Device

Figure 18:
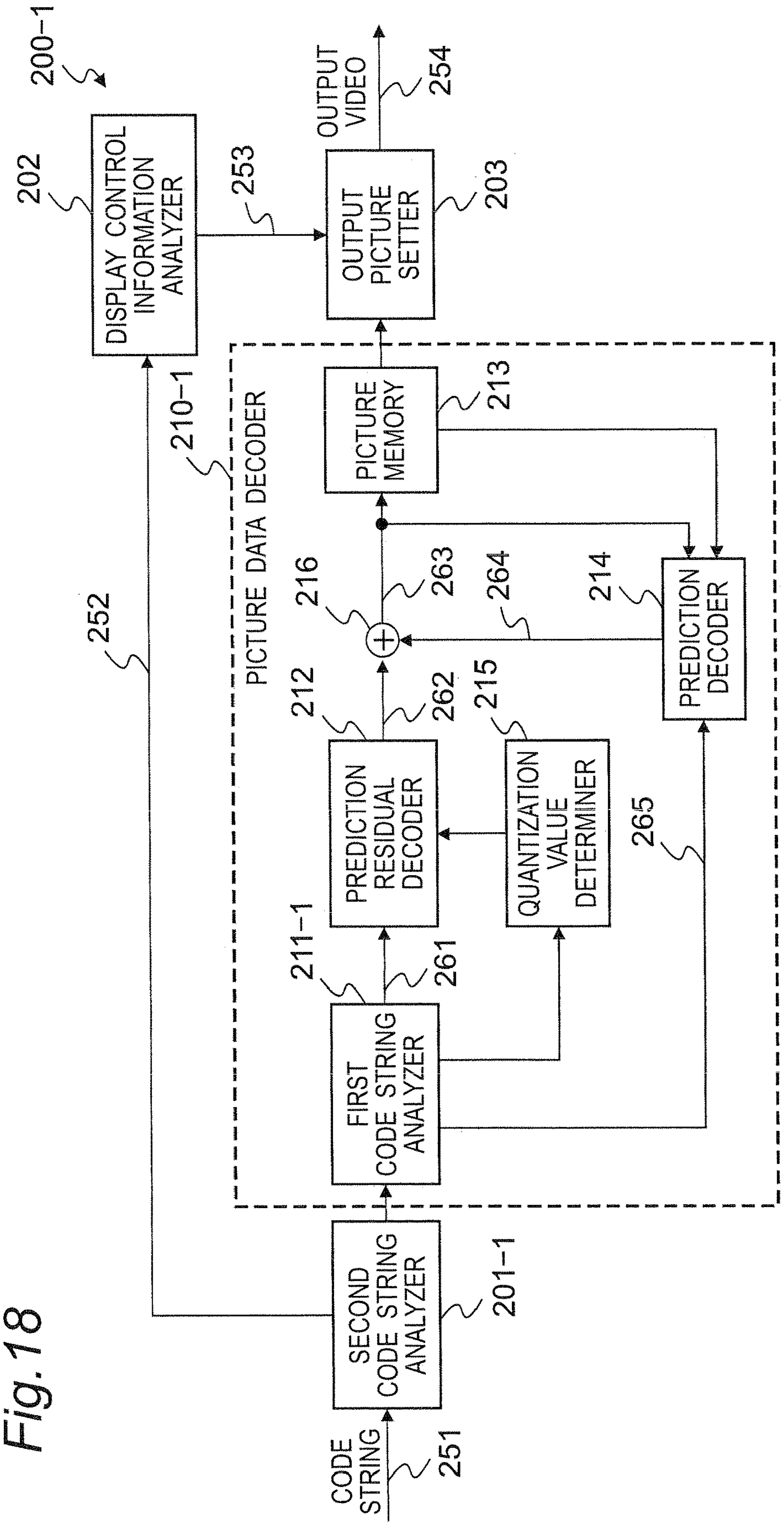
FIG. 18 is a block diagram illustrating a configuration of a video decoding device according to a fourth embodiment.

FIG. 18 is a block diagram of a video decoding device according to the embodiment.

The video decoding device 200-1 includes a picture data decoder 210-1 and a second code string analyzer 201-1 in place of the picture data decoder 210 and the second code string analyzer 201 of the video decoding device 200 of the second embodiment. The picture data decoder 210-1 includes a first code string analyzer 211-1 in place of the first code string analyzer 211.

For convenience of the description, a detailed description of the same configuration as that of the second embodiment will be omitted below. Further, in FIG. 18, blocks which have the same functions as those of the blocks in FIG. 1 are denoted by the same numbers as the blocks in FIG. 1.

The second code string analyzer 201 extracts at least display control information from the extended information area of the code string of header information included in the input code string signals 251. Then, the second code string analyzer 201 outputs the extracted information to the display control information analyzer 202 as display control information signals 252.

The picture data decoder 210 generates a decoded image of an objective picture by performing a decoding process in units of blocks on a code string of picture data included in the input code string signals 251. At this moment, a common decoding process is applied in units of pictures without depending on whether the video format is the progressive format or the interlace format and, further, the code string of the picture data to be decoded has a common syntax.

The first code string analyzer 211 performs analyzing of decoding control information and analyzing of the picture data in units of blocks by performing variable length decoding on the code string of picture data of the input code string signals 251. The decoding control information includes information about decoding control in units of sequences and decoding control in units of pictures. The first code string analyzer 211 outputs residual encoding signals 261 which are acquired as a result of analyzing, to the prediction residual decoder 212. Further, the first code string analyzer 211 outputs prediction information signals 265 which are acquired as a result of analyzing to the prediction decoder 214. Still further, the first code string analyzer 211 outputs quantization value information which is acquired as a result of analyzing to the quantization value determiner 215.

2. Display Control Method

Figure 19:
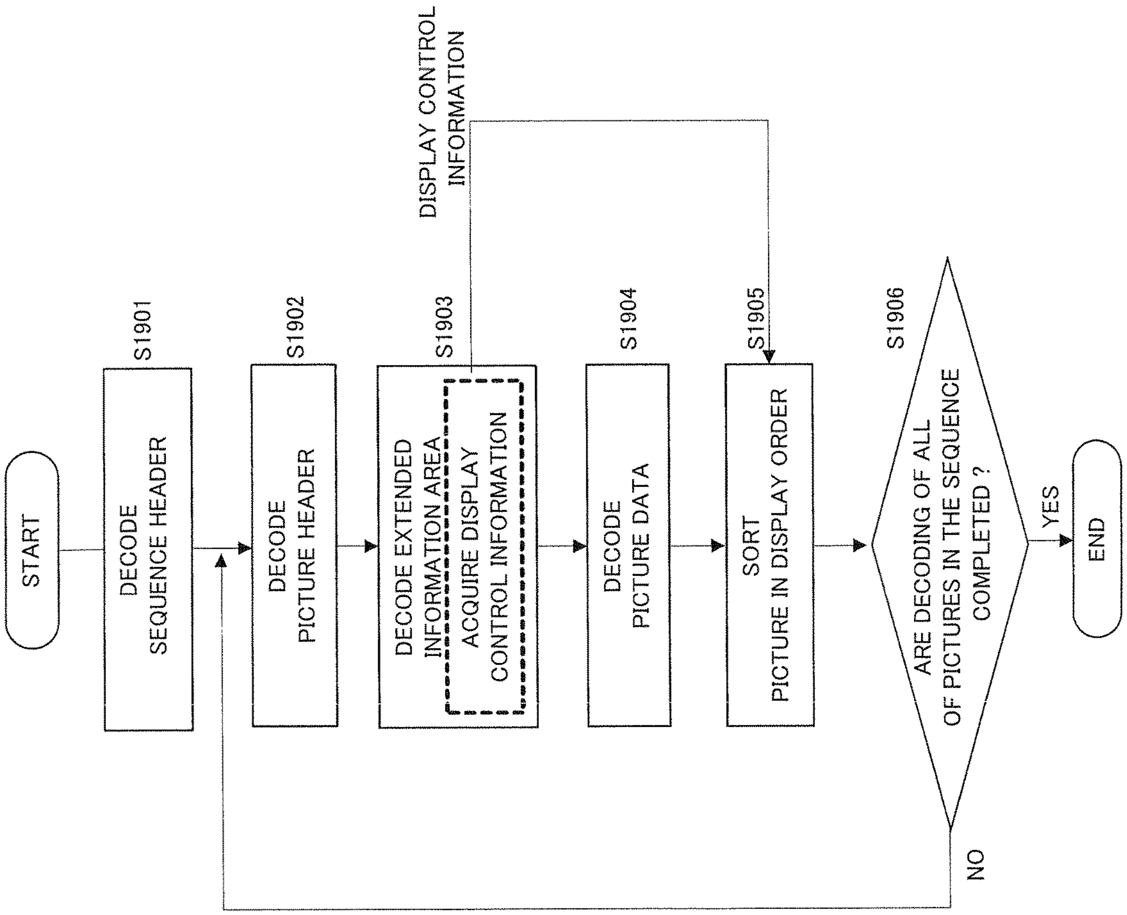
FIG. 19 is a flow chart of decoding process according to the fourth embodiment.

A method of analyzing the display control information in the display control information analyzer 202 and performing sort on the decoded pictures in an output order in the output picture setter 203 to be an output image will be described specifically with reference to the flow chart of the entire decoding process of FIG. 19.

First, the first code string analyzer 211-1 performs code string analyzing of header areas in units of sequences (S1901).

Next, the first code string analyzer 211-1 performs code string analyzing of header areas in units of pictures (S1902).

Next, the second code string analyzer 201-1 performs code string analyzing of extended information area (S1903). At this moment, the display control information analyzer 202 acquires the display control information in units of sequences and the display control information in units of pictures.

Next, the picture data decoder 210-1 performs a series of decoding process to generate a decoded image of the objective pictures (S1904). Meanwhile, in step S1904, a common decoding process is applied without depending on whether the video format is the progressive format or the interlace format.

Next, the output picture setter 203 sorts the decoded image which is stored in the decoding order in a display order and selects a picture to be displayed (S1905). At this moment, the output picture setter 203 sorts the pictures according to a display control method acquired as a result of analyzing by the display control information analyzer 202.

Next, when the processes on the currently processed picture to be decoded are completed, the operation returns to step S1902 to proceed to the decoding process of the next picture, and the processes from step S1902 to step S1904 are repeated until the decoding processes of all of the pictures in the sequence are completed (S1905).

3. Sort of Pictures

As for the sort process of pictures in step S1905, the same processes as those described with reference to FIGS. 11, 12, and 13 in the second embodiment are performed. Therefore, the description of the sort process will be omitted.

4. Configuration and Syntax of the Code String

Since the configuration and syntax of the code string to be decoded in the embodiment are completely the same as those described in the first embodiment with reference to FIGS. 6 to 8, the description of them will be omitted here.

5. Summarization 5-1. Configuration

The video decoding device 200-1 of the embodiment decodes a code string in units of pictures, the code string being acquired as a result of encoding video signals in an interlace video format or a progressive video format in units of pictures. The video decoding device 200-1 includes:

the second code string analyzer 201-1 which analyzes the code string to acquire an extended information area code string and a first code string;

the second code string analyzer 201-1 (extended information area decoder) which acquires display control information to be used in displaying a decoded picture, from the extended information area code string;

the picture data decoder 210-1 which decodes the first code string to acquire the picture by using common syntax analyzing method and a common signal processing method, which are not dependent on the video formats; and the output picture setter 203 which, in the case where the display control information indicates the progressive format, sets the acquired picture as a frame and outputs the frame one by one in a display order, and in the case where the display control information indicates the interlace format, sets the acquired picture as a field and outputs a pair of top field and bottom field in a display order when the a pair of fields are acquired, wherein the display control information includes sequence unit display control information and picture unit display control information, the sequence unit display control information being commonly used in a display process of all pictures which belong to a sequence to be decoded and the picture unit display control information being individually used in a display process of a picture to be decoded, and the extended information area decoder 201-1 acquires each of the sequence unit display control information and the picture unit display control information from an extended information area in units of pictures.

For example, each extended information area of each picture unit which belongs to the same sequence stores the sequence unit display control information of the same value.

For example, the second code string analyzer 201-1 (extend information area decoder) acquires the sequence unit display control information which includes a first identifier specifying whether the video signals to be decoded are in the progressive format or the interlace format, and the output picture setter 203 changes the output method of the picture based on the acquired first identifier.

For example, in the case where the video signals to be decoded are in the interlace format, the second code string analyzer 201-1 (extend information area decoder) acquires the sequence unit display control information which includes a second identifier specifying whether two fields which belong to the same frame are always continual with each other in the decoding order in the sequence, and the output picture setter 203 changes the output method of the picture based on the acquired second identifier.

For example, in the case where the video signals to be decoded are in the interlace format, the second code string analyzer 201-1 (extend information area decoder) acquires the sequence unit display control information which includes information indicating the maximum value of an interval between the first field and the second field which belong to the same frame in the decoding order in the sequence, and the output picture setter 203 changes the output method of the picture based on the acquired information indicating the maximum value.

For example, the second code string analyzer 201-1 (extend information area decoder) acquires the picture unit display control information which includes a third identifier specifying that the picture to be decoded is (1) to be displayed as a frame which belongs to the progressive video signals, (2) to be displayed as a top field which belongs to the interlace video signals, (3) to be displayed as a bottom field which belongs to the interlace video signals, or (4) to be displayed in another display format in the display process of the picture to be decoded, and the output picture setter 203 changes the output method of the picture based on the acquired third identifier.

For example, the second code string analyzer 201-1 (extend information area decoder) acquires the picture unit display control information which includes a third identifier specifying that the picture to be decoded is (1) to be displayed as a top field which belongs to the interlace video signals or (2) to be displayed as a bottom field which belongs to the interlace video signals, in the display process of the picture to be decoded only in the case where the video signals to be decoded are in the interlace format, and the output picture setter 203 changes the output method of the picture based on the acquired third identifier.

For example, the second code string analyzer 201-1 (extend information area decoder) acquires the picture unit display control information which includes specification information specifying a picture that is paired with the picture to be decoded and belongs to the same frame as that of the picture to be decoded in the case where the picture to be decoded is to be displayed as a top field or a bottom field which belongs to the interlace video signals, and the output picture setter 203 outputs the picture to be decoded by setting the picture to be decoded as paired with the picture specified in the specification information.

For example, the second code string analyzer 201-1 (extended information area decoder) acquires, as the specification information, display order information which is assigned to the picture that is paired with the picture to be decoded and belongs to the same frame as that of the picture to be decoded.

For example, the second code string analyzer 201-1 (extended information area decoder) acquires, as the specification information, a difference value between the display order information which is assigned to the picture to be decoded and the display order information which is assigned to the picture that is paired with the picture to be decoded and belongs to the same frame as that of the picture to be decoded.

A video decoding method of the embodiment decodes a code string in units of pictures, the code string being acquired as a result of encoding video signals in an interlace video format or a progressive video format in units of pictures. The video decoding method comprises:

analyzing the code string to acquire an extended information area code string and a first code string, acquiring display control information to be used in displaying a decoded picture, from the extended information area code string, decoding the first code string to acquire the picture by using common syntax analyzing method and a common signal processing method, which are not dependent on the video formats, and in the case where the display control information indicates the progressive format, setting the acquired picture as a frame and outputting the frame one by one in a display order, and in the case where the display control information indicates the interlace format, setting the acquired picture as a field and outputting a pair of top field and bottom field in a display order when the pair of top field and bottom field are acquired, wherein the display control information includes sequence unit display control information and picture unit display control information, the sequence unit display control information being commonly used in a display process of all pictures which belong to a sequence to be decoded and the picture unit display control information being individually used in a display process of a picture to be decoded, and each of the sequence unit display control information and the picture unit display control information is acquired from an extended information area in units of pictures.

5-2. Effects and the Like

With the video decoding device 200-1 according to the embodiment, a decoding process and display control are allowed to be performed on picture data under a common control with the processing amount being not increased for both a code string which is acquired as a result of encoding a progressive video and a code string which is acquired as a result of encoding an interlace video. That facilitates implementation of a decoding device.

As described in the third embodiment, in the present embodiment, the extended information area in which only the information unnecessary for the encoding process (display control information, and the like) is described and the other areas in which information necessary for the decoding process is described are completely separated. As a result, the present disclosure facilitates sending of only the code strings needed by respective levels of the level of performing the decoding process and the level of performing the display process to the respective levels for the purpose like the above described use, therefore, improves independence of each level. That is, it allows to form the level of performing the decoding process (hardware) by using completely the common components in both the decoding device which supports the progressive format and the decoding device which supports the interlace format.

Other Embodiments

Programs having the functions equivalent to the respective units included in the video encoding device and the video decoding device described in the above embodiments can be recorded in a recording medium such as a flexible disk. That facilitates implementation of the processes described in the above embodiments in an independent computer system. The recording medium is not limited to the flexible disk and may be any medium as far as it can record a program, such as an optical disk, an IC card, and a ROM cassette.

The functions equivalent to the respective units included in the video encoding device and the video decoding device described in the above embodiments can be realized as large scale integrated circuits (LSI). The large scale integrated circuits may be made into a chip which includes some or all of the functions. The LSI may be referred to as IC, system LSI, super LSI, and ultra LSI according to the integration density.

Further, the technique of making the above described functions into an integrated circuit is not limited to LSI, and the functions may be implemented by a dedicated circuit or a general purpose processor. An FPGA (Field Programmable Gate Array) which is capable of programing the manufactured LSI or a reconfigurable processor which is capable of reconfiguring connection and setting of the circuit cells inside the LSI may be used.

Furthermore, when a new technology of an integrated circuit will be developed to replace the LSI and the like as a result of advancement of the semiconductor technology or another derivative technology, it is a matter of course that the new technology may be used in making the functional blocks into an integrated circuit.

The present disclosure may be applied to a broadcast wave recording apparatus including the above described video encoding device and video decoding device, such as a DVD recorder and a BD recorder, which compresses and records the broadcast waves sent from a broadcast station.

At least some of the functions of the video encoding device and the video decoding device according to the above described embodiments or their modifications may be combined together.

INDUSTRIAL APPLICABILITY

The present disclosure is useful as a video encoding device which encodes each picture of an input video and outputs the encoded video data or a video decoding device which decodes the encoded video data to generate a decoded image in a video camera, a digital camera, a video recorder, a mobile phone, and a personal computer, for example.

What is claimed is:

1. A transmitting method comprising:

generating a bitstream by an encoding method; and transmitting the bitstream, wherein the encoding method comprises:

determining video format information indicating which video format is used for encoding the video from among an interlace format of the predetermined encoding standard or a progressive format of the predetermined encoding standard;

(i) setting each of all frames or all fields which are included in the video, as a picture included in the video, regardless of whether the video format is the interlace format of the predetermined encoding standard or the progressive format of the predetermined encoding standard, and (ii) setting a Picture Order Count (POC) indicating display order to each of the pictures included in the video one by one, the POC being different each other; and encoding a picture to be encoded, from among the pictures included in the video, with reference to a picture previously encoded before encoding the picture to be encoded, the picture to be encoded being a field or a frame, wherein in the encoding, (i) picture data of the picture to be encoded is always encoded with a syntax structure, which is a syntax structure for encoding the progressive format of the predetermined encoding standard regardless of whether the video format is the interlace format of the predetermined encoding standard or the progressive format of the predetermined encoding standard, (ii) the video format information indicating the video format is encoded in a header of a sequence which is a unit of the video, and (iii) the encoded bitstream is generated, and in the encoding, a top field and a bottom field belonging to the same picture continually encoded in the encoded bit stream, when the video format is the interlace format of the predetermined encoding standard.

2. A transmitting method comprising:

generating a bitstream by an encoding method; and transmitting the bitstream, wherein the encoding method comprises:

determining video format information indicating which video format is used for encoding the video from among an interlace format of the predetermined encoding standard or a progressive format of the predetermined encoding standard;

(i) setting each of all frames or all fields which are included in the video, as a picture included in the video, regardless of whether the video format is the interlace format of the predetermined encoding standard or the progressive format of the predetermined encoding standard, and (ii) setting a Picture Order Count (POC) indicating display order to each of the pictures included in the video one by one, the POC being different each other; and encoding a picture to be encoded, from among the pictures included in the video, with reference to a picture previously encoded before encoding the picture to be encoded, the picture to be encoded being a field or a frame, wherein in the encoding, (i) picture data of the picture to be encoded is always encoded with a syntax structure, which is a common syntax structure for encoding video format of the predetermined encoding standard regardless of whether the video format is the interlace format of the predetermined encoding standard or the progressive format of the predetermined encoding standard, (ii) the video format information indicating the video format is encoded in a header of a sequence which is a unit of the video, and (iii) the encoded bitstream is generated, and in the encoding, a top field and a bottom field belonging to the same picture continually encoded in the encoded bit stream, when the video format is the interlace format of the predetermined encoding standard.

* * * * *